US012791303B2

(12) United States Patent
Fukakusa et al.

(10) Patent No.: US 12,791,303 B2
(45) Date of Patent: Nov. 10, 2026

(54) DISTANCE MEASURING DEVICE

(71) Applicant: Panasonic Intellectual Property Management Co., Ltd., Osaka (JP)

(72) Inventors: Masaharu Fukakusa, Kumamoto (JP); Takahiro Nibu, Osaka (JP); Mayu Taba, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 122 days.

(21) Appl. No.: 18/894,097

(22) Filed: Sep. 24, 2024

(65) Prior Publication Data

US 2025/0012559 A1 Jan. 9, 2025

Related U.S. Application Data

(63) Continuation of application No. PCT/JP2023/010731, filed on Mar. 17, 2023.

(30) Foreign Application Priority Data

Mar. 24, 2022 (JP) ................................ 2022-048710

(51) Int. Cl.
*G01B 11/02* (2006.01)
*G01B 11/25* (2006.01)

(52) U.S. Cl.
CPC ............ *G01B 11/026* (2013.01); *G01B 11/25* (2013.01); *G01B 11/2545* (2013.01)

(58) Field of Classification Search
CPC ... G01B 11/026; G01B 11/25; G01B 11/2545; G01C 3/06
See application file for complete search history.

(56) References Cited

U.S. PATENT DOCUMENTS

2007/0009150 A1* 1/2007 Suwa ...................... G06T 7/521 382/154
2014/0307085 A1* 10/2014 Ohsawa ............... G01B 11/026 348/136

(Continued)

FOREIGN PATENT DOCUMENTS

CN 112991383 A 6/2021
CN 113048907 A 6/2021

(Continued)

OTHER PUBLICATIONS

International Search Report received in PCT Application No. PCT/JP2023/010731 dated May 9, 2023, w/ English Translation.

(Continued)

*Primary Examiner* — Michael A Lyons
(74) *Attorney, Agent, or Firm* — Rimon P.C.

(57) ABSTRACT

A distance measuring device includes: a first imager and a second imager provided so as to be aligned such that fields of view thereof overlap each other; a projector configured to project pattern light in which a plurality of types of light regions having wavelength bands different from each other are distributed in a predetermined pattern, onto a range where the fields of view overlap; and a measurer configured to measure a distance to an object surface onto which the pattern light is projected, by performing a stereo correspondence point searching process on images respectively acquired by the first imager and the second imager.

9 Claims, 14 Drawing Sheets

(56) References Cited

U.S. PATENT DOCUMENTS

| | | | | |
|---|---|---|---|---|
| 2015/0339833 | A1 | 11/2015 | Harada et al. | |
| 2018/0316909 | A1* | 11/2018 | Tsubaki | H04N 13/282 |
| 2021/0358147 | A1 | 11/2021 | Matsumoto et al. | |
| 2021/0358157 | A1* | 11/2021 | Ohnishi | H04N 13/239 |
| 2022/0222843 | A1* | 7/2022 | Ota | G01B 11/2509 |

FOREIGN PATENT DOCUMENTS

| | | | |
|---|---|---|---|
| JP | 2013-190394 | A | 9/2013 |
| JP | 2015-222220 | A | 12/2015 |
| JP | 2016-142645 | A | 8/2016 |
| JP | 6524680 | B2 * | 6/2019 |
| JP | 2019-138817 | A | 8/2019 |
| JP | 2020-193945 | A | 12/2020 |

OTHER PUBLICATIONS

Office Action issued on Jan. 6, 2026 in the corresponding Japanese patent application No. 2024-510144, w/ English Translation.

* cited by examiner

FIG. 6A DISTRIBUTION OF DOT LIGHT DT1
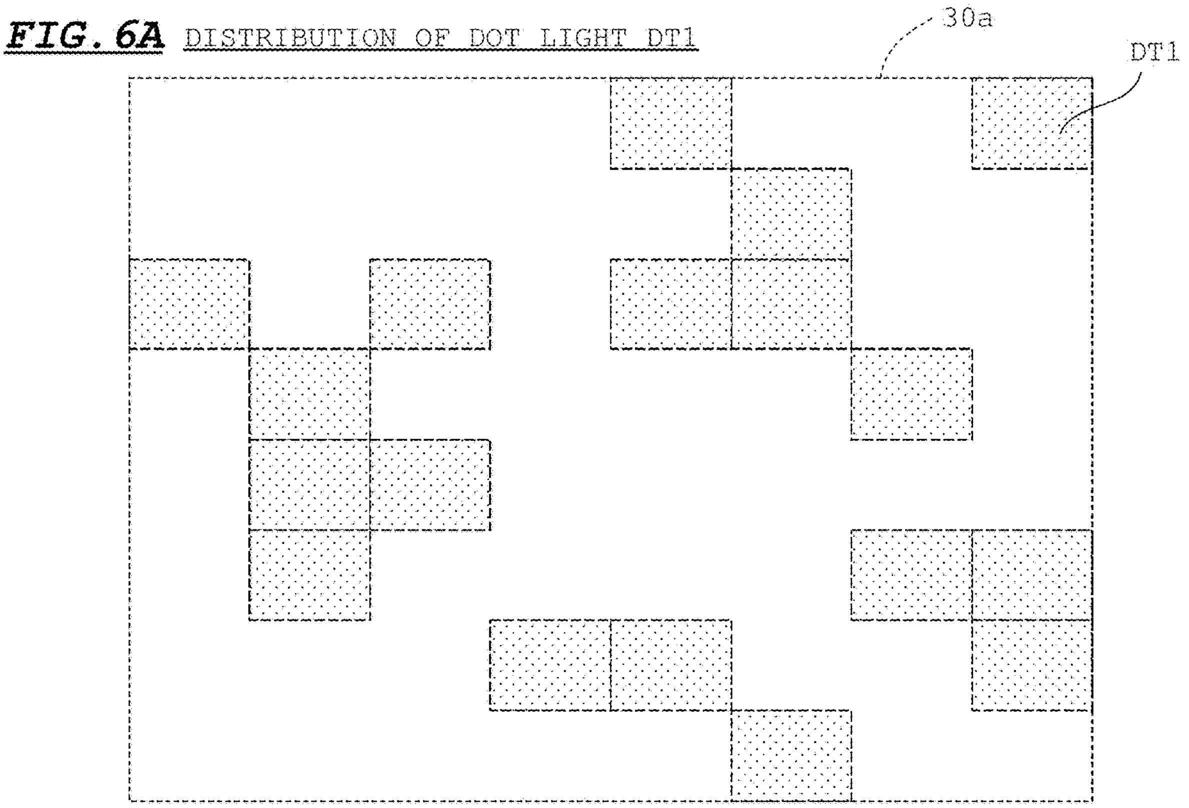
FIG. 6B DISTRIBUTION OF DOT LIGHT DT2
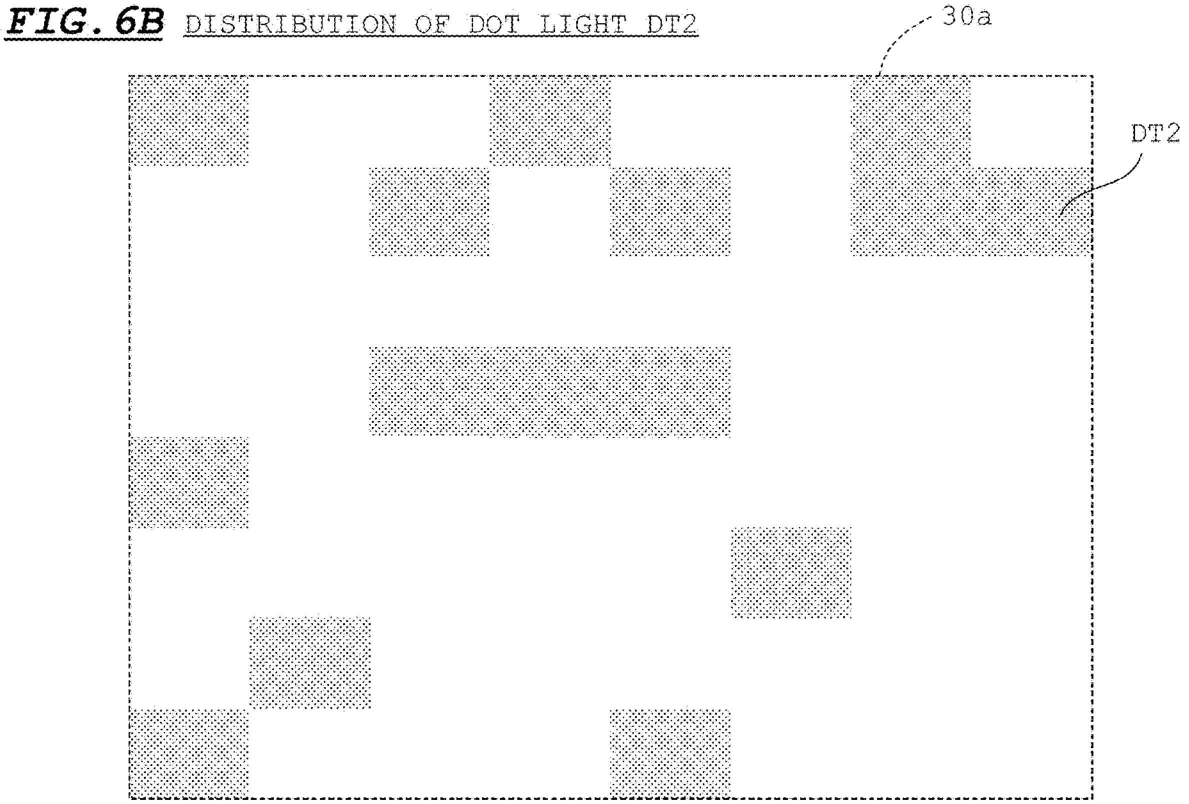

FIG. 7A DISTRIBUTION OF DOT LIGHT DT3
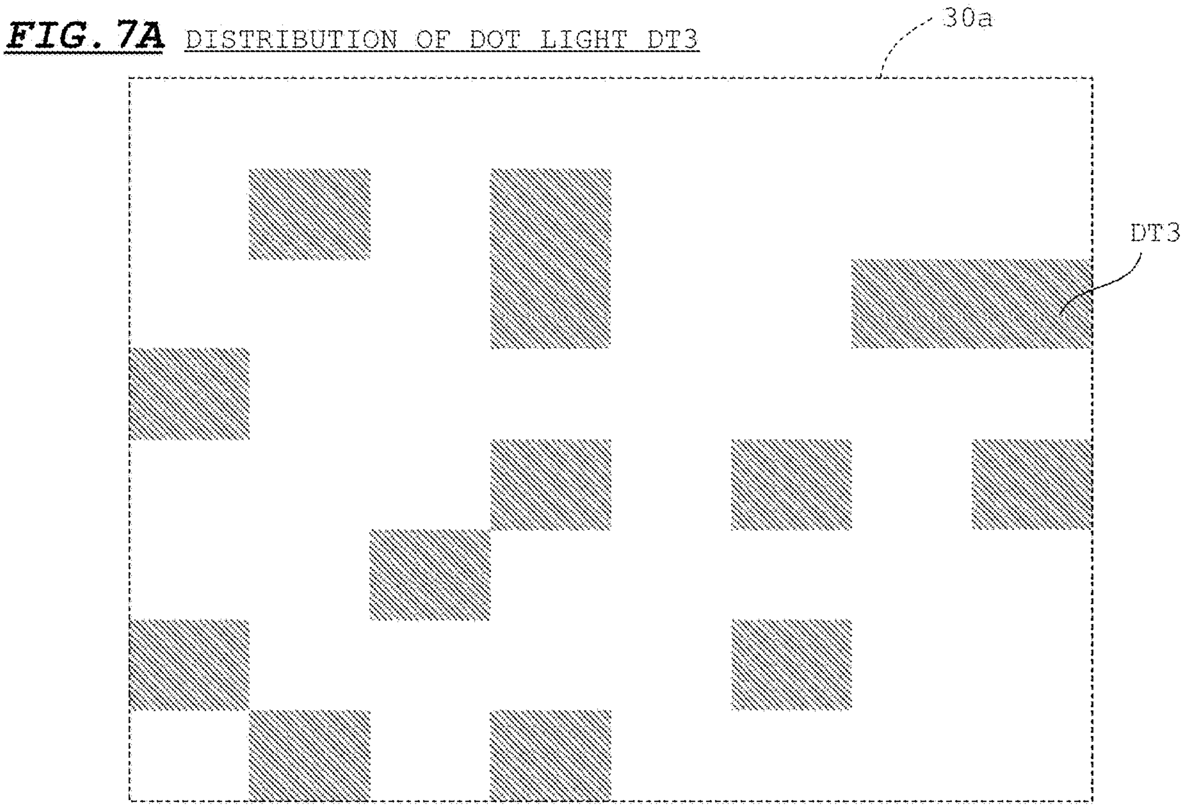
FIG. 7B DISTRIBUTION OF LIGHTLESS DOT
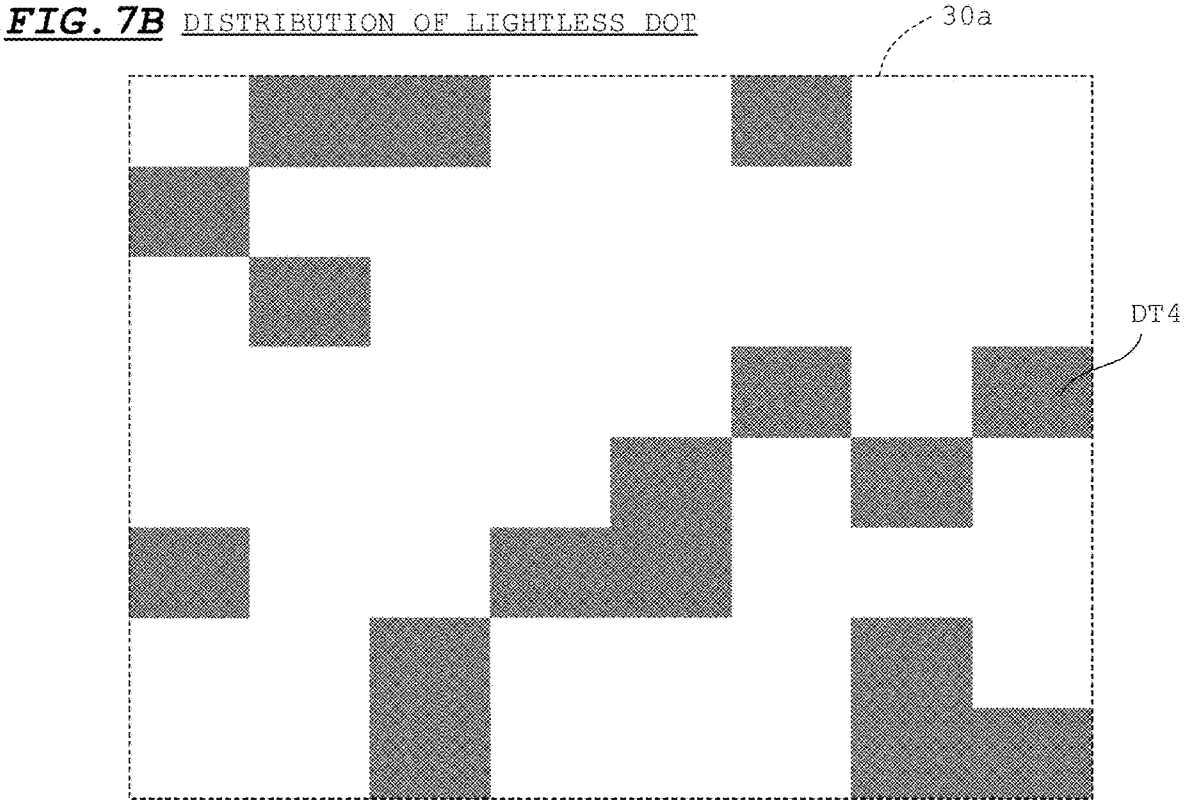

LIGHT SOURCE

FILTER

MEASUREMENT SURFACE

IMAGER

DOT LIGHT

LIGHT SOURCE

FILTER

MEASUREMENT SURFACE

IMAGER

DOT LIGHT

LIGHT SOURCE

FILTER

MEASUREMENT SURFACE

IMAGER

DOT LIGHT

FIG. 12 MODIFICATION 1
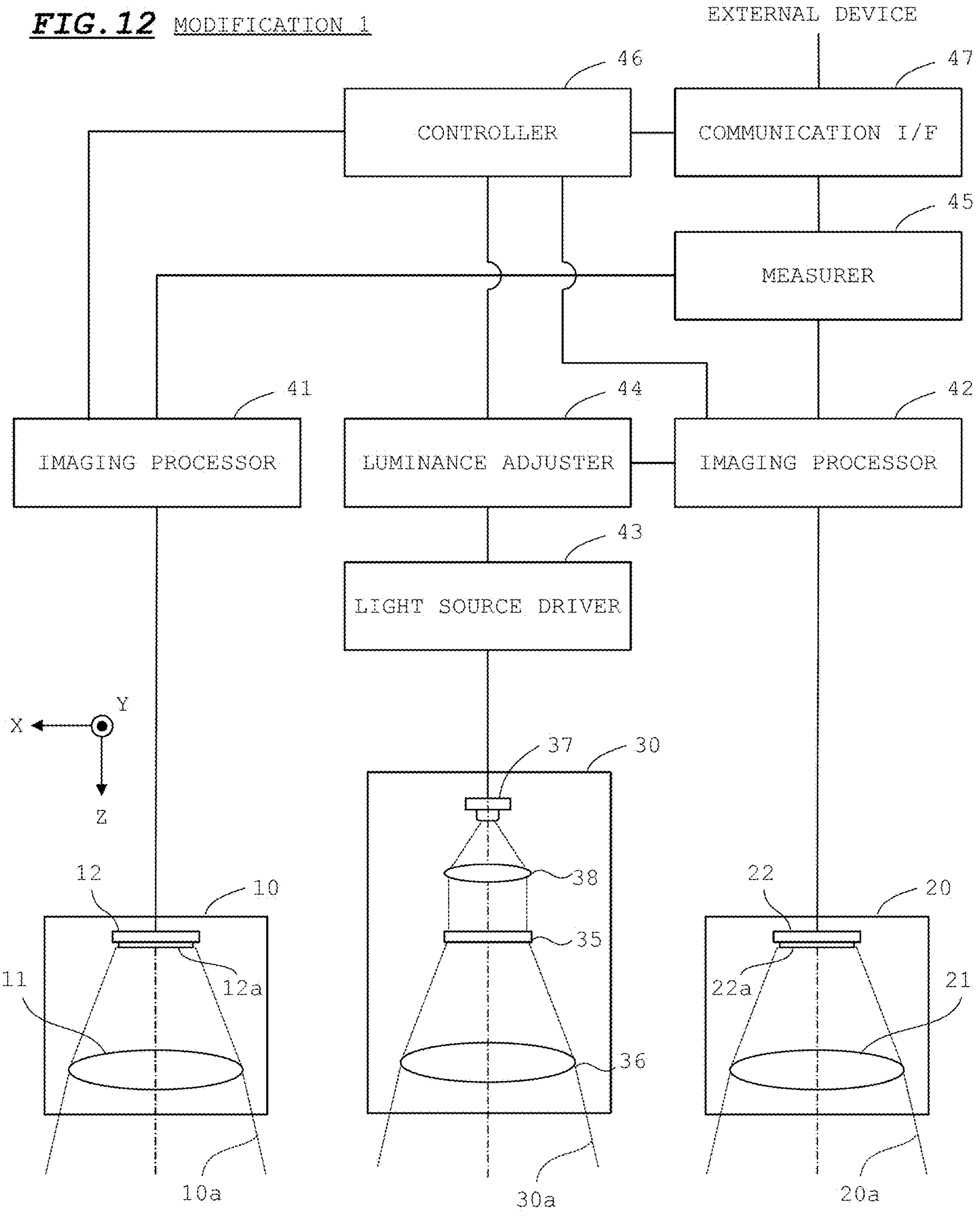

LIGHT SOURCE

FILTER

MEASUREMENT SURFACE

IMAGER

DOT LIGHT

FIG.14A MODIFICATION 2
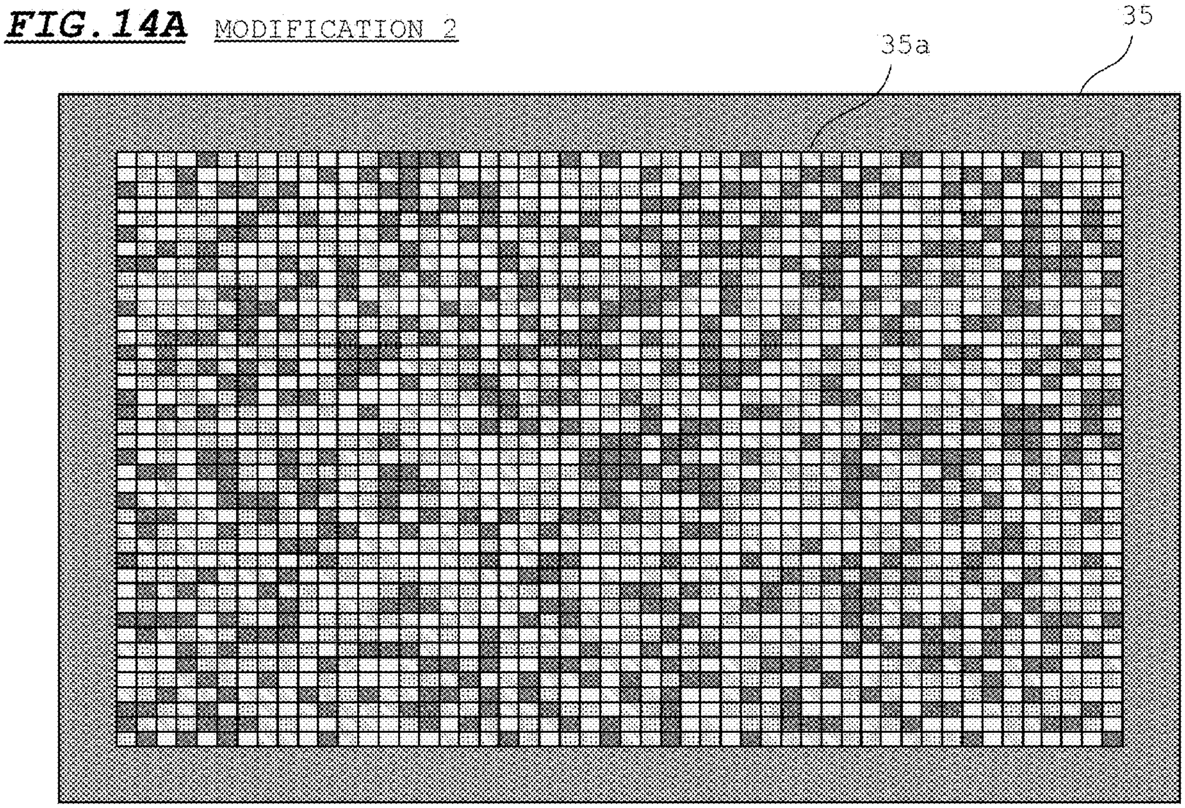
FIG.14B
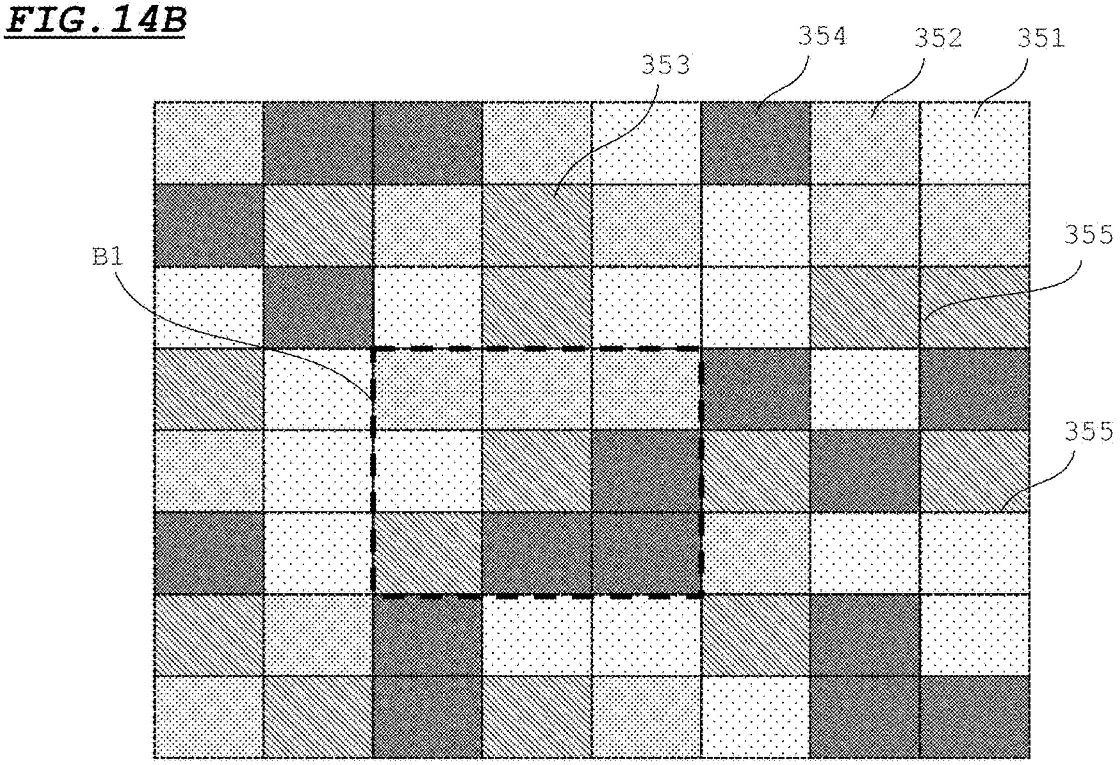

DISTANCE MEASURING DEVICE

CROSS REFERENCE TO RELATED APPLICATION

This application is a continuation of International Application No. PCT/JP2023/010731 filed on Mar. 17, 2023, entitled "DISTANCE MEASURING DEVICE", which claims priority under 35 U.S.C. Section 119 of Japanese Patent Application No. 2022-048710 filed on Mar. 24, 2022, entitled "DISTANCE MEASURING DEVICE". The disclosures of the above applications are incorporated herein by reference.

BACKGROUND OF THE INVENTION

Field of the Invention

The present invention relates to a distance measuring device for processing images acquired by a stereo camera and measuring the distance to an object.

Description of Related Art

To date, a distance measuring device for processing images acquired by a stereo camera and measuring the distance to an object has been known. In this device, a parallax is detected from an image captured by each camera. A pixel block having a highest correlation with a target pixel block on one image (standard image) is searched for on another image (reference image). The search range is set in the direction of separation between the cameras with a position that is the same as that of the target pixel block, as a standard position. The pixel deviation amount of the pixel block extracted by the search, with respect to the standard position, is detected as the parallax. The distance to an object is calculated from this parallax by a triangulation method.

In such a distance measuring device, further, a specific pattern of light can be projected onto the object. Accordingly, even if the surface of the object is solid in color, the above search can be accurately performed.

Japanese Laid-Open Patent Publication No. 2013-190394 below describes a configuration in which a dot pattern of light is generated by a diffractive optical element from laser light emitted from a semiconductor laser. In this configuration, the diffractive optical element has a multi-step diffraction efficiency difference, and a dot pattern having a multi-step luminance gradation is formed due to this diffraction efficiency difference.

However, the surface of an object may have a low reflectance or a high light absorption rate in a certain wavelength band. In the configuration of the above Japanese Laid-Open Patent Publication No. 2013-190394, if the wavelength of the laser light is included in this wavelength band, the luminance gradation of the dot pattern cannot be appropriately acquired on the camera side. Therefore, it becomes difficult to appropriately perform a stereo correspondence point searching process for a pixel block, and as a result, the distance to the object surface cannot be appropriately measured.

SUMMARY OF THE INVENTION

A distance measuring device according to a main aspect of the present invention includes: a first imager and a second imager provided so as to be aligned such that fields of view thereof overlap each other; a projector configured to project pattern light in which a plurality of types of light regions having wavelength bands different from each other are distributed in a predetermined pattern, onto a range where the fields of view overlap; and a measurer configured to measure a distance to an object surface onto which the pattern light is projected, by performing a stereo correspondence point searching process on images respectively acquired by the first imager and the second imager.

In the distance measuring device according to the present aspect, pattern light in which the plurality of types of light regions having wavelength bands different from each other are distributed in a predetermined pattern is projected onto the object surface. Therefore, even if the object surface has a low reflectance or a high light absorption rate with respect to any of these wavelength bands, the pattern according to lights in the other wavelength bands is included in the captured images captured by the first imager and the second imager. Therefore, the specificity of each pixel block is maintained by the distribution pattern of the lights in the other wavelength bands, and the stereo correspondence point search can be accurately performed. Therefore, the distance to the object surface can be accurately measured.

The effects and the significance of the present invention will be further clarified by the description of the embodiment below. However, the embodiment below is merely an example for implementing the present invention. The present invention is not limited to the description of the embodiment below in any way.

BRIEF DESCRIPTION OF THE DRAWINGS

FIG. 6A and FIG. 6B are respectively diagrams schematically showing light regions of lights having passed through filter regions of different types according to the embodiment;

FIG. 7A and FIG. 7B are respectively diagrams schematically showing light regions of lights having passed through filter regions of different types according to the embodiment;

FIG. 12 is a diagram showing a configuration of the distance measuring device according to Modification 1;

FIG. 14A is a diagram schematically showing a configuration of the filter according to Modification 2, and FIG. 14B is a diagram showing a partial region of the filter in an enlarged manner according to Modification 2.

It is noted that the drawings are solely for description and do not limit the scope of the present invention in any way.

DETAILED DESCRIPTION

Hereinafter, an embodiment of the present invention will be described with reference to the drawings. For convenience, in each drawing, X, Y, and Z-axes orthogonal to each other are additionally shown. The X-axis direction is an alignment direction of a first imager and a second imager, and the Z-axis positive direction is the imaging direction of each imager.

Figure 1:
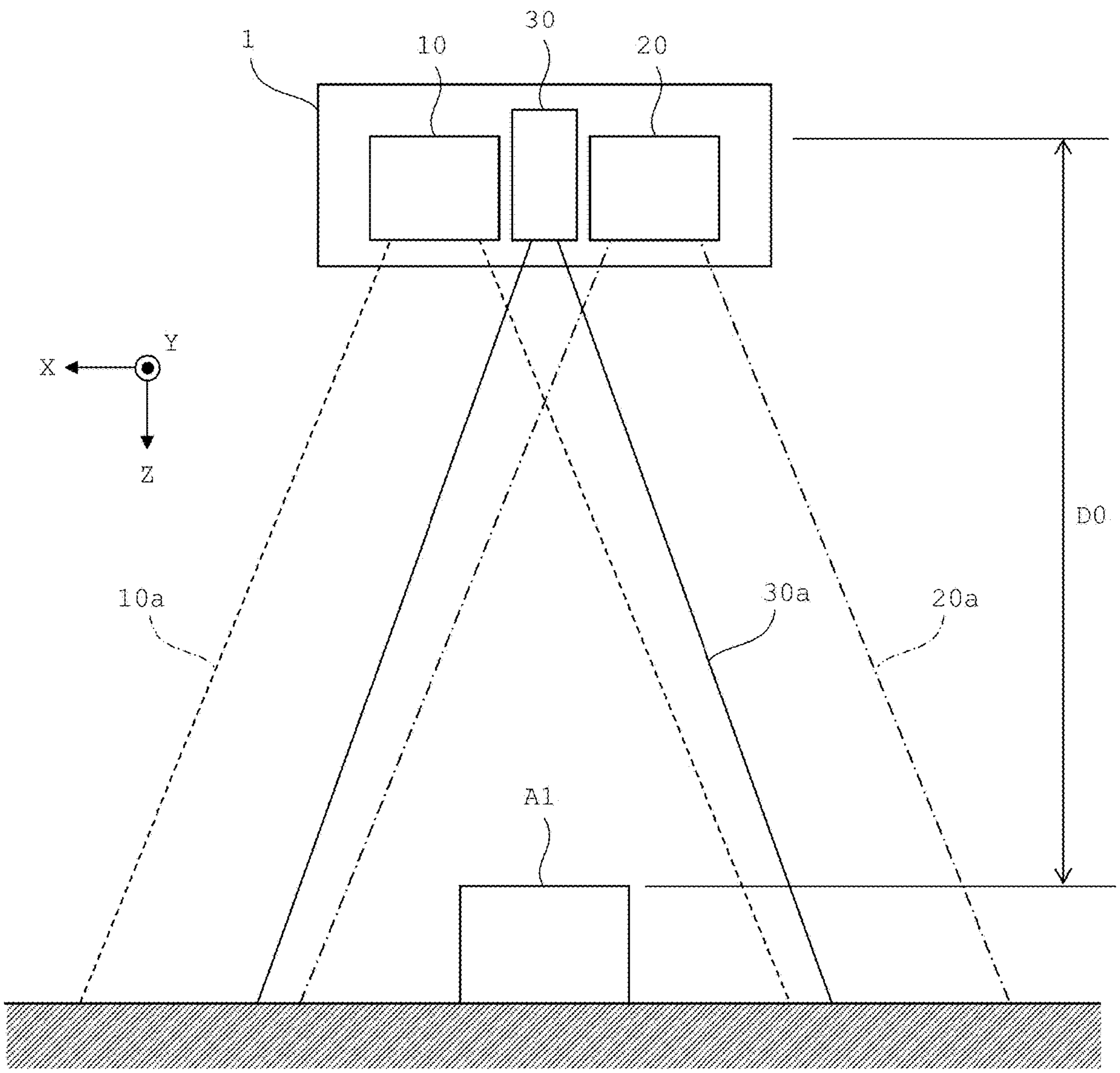
FIG. 1 is a diagram showing a basic configuration of a distance measuring device according to an embodiment.

FIG. 1 is a diagram showing a basic configuration of a distance measuring device 1.

The distance measuring device 1 includes a first imager 10, a second imager 20, and a projector 30.

The first imager 10 captures an image of the range of a field of view 10*a* oriented in the Z-axis positive direction. The second imager 20 captures an image of the range of a field of view 20*a* oriented in the Z-axis positive direction. The first imager 10 and the second imager 20 are provided so as to be aligned in the X-axis direction such that the fields of view 10*a*, 20*a* thereof overlap each other. The imaging direction of the first imager 10 may be slightly inclined in the direction of the second imager 20 from the Z-axis positive direction, and the imaging direction of the second imager 20 may be slightly inclined in the direction of the first imager 10 from the Z-axis positive direction. The positions in the Z-axis direction and the positions in the Y-axis direction of the first imager 10 and the second imager 20 are the same with each other.

The projector 30 projects pattern light 30*a* in which light is distributed in a predetermined pattern, onto a range where the field of view 10*a* of the first imager 10 and a field of view 20*a* of the second imager 20 overlap. The projection direction of the pattern light 30*a* by the projector 30 is the Z-axis positive direction. The pattern light 30*a* is projected onto the surface of an object A1 present in a range where the fields of view 10*a*, 20*a* overlap.

The distance measuring device 1 measures a distance DO to the object A1 through a stereo correspondence point search using captured images respectively captured by the first imager 10 and the second imager 20. At this time, the pattern light 30*a* is projected from the projector 30 onto the surface of the object A1. Accordingly, the pattern of the pattern light 30*a* is projected in the captured images captured by the first imager 10 and the second imager 20. Therefore, even if the surface of the object A1 is solid in color, the stereo correspondence point search can be accurately performed, and the distance D0 to the surface of the object A1 can be accurately measured.

Here, the surface of the object A1 may have a high light absorption rate or a low reflectance in a certain wavelength band. In this case, if the wavelength band of the pattern light 30*a* is included in this wavelength band, the first imager 10 and the second imager 20 may fail to appropriately capture images of the pattern of the pattern light 30*a*. Therefore, there are cases where the above-described stereo correspondence point search cannot be appropriately performed, and as a result, the distance D0 to the surface of the object A1 cannot be accurately measured.

Therefore, in the present embodiment, the pattern light 30*a* is configured such that a plurality of types of light regions having wavelength bands different from each other are distributed in a predetermined pattern. Even if the surface of the object A1 has a low reflectance or a high light absorption rate with respect to any of these wavelength bands, images of the pattern according to lights in the other wavelength bands are captured by the first imager 10 and the second imager 20. Therefore, the stereo correspondence point search can be appropriately performed based on the pattern of lights in the other wavelength bands, and the distance to the surface of the object A1 can be accurately measured.

Figure 2:
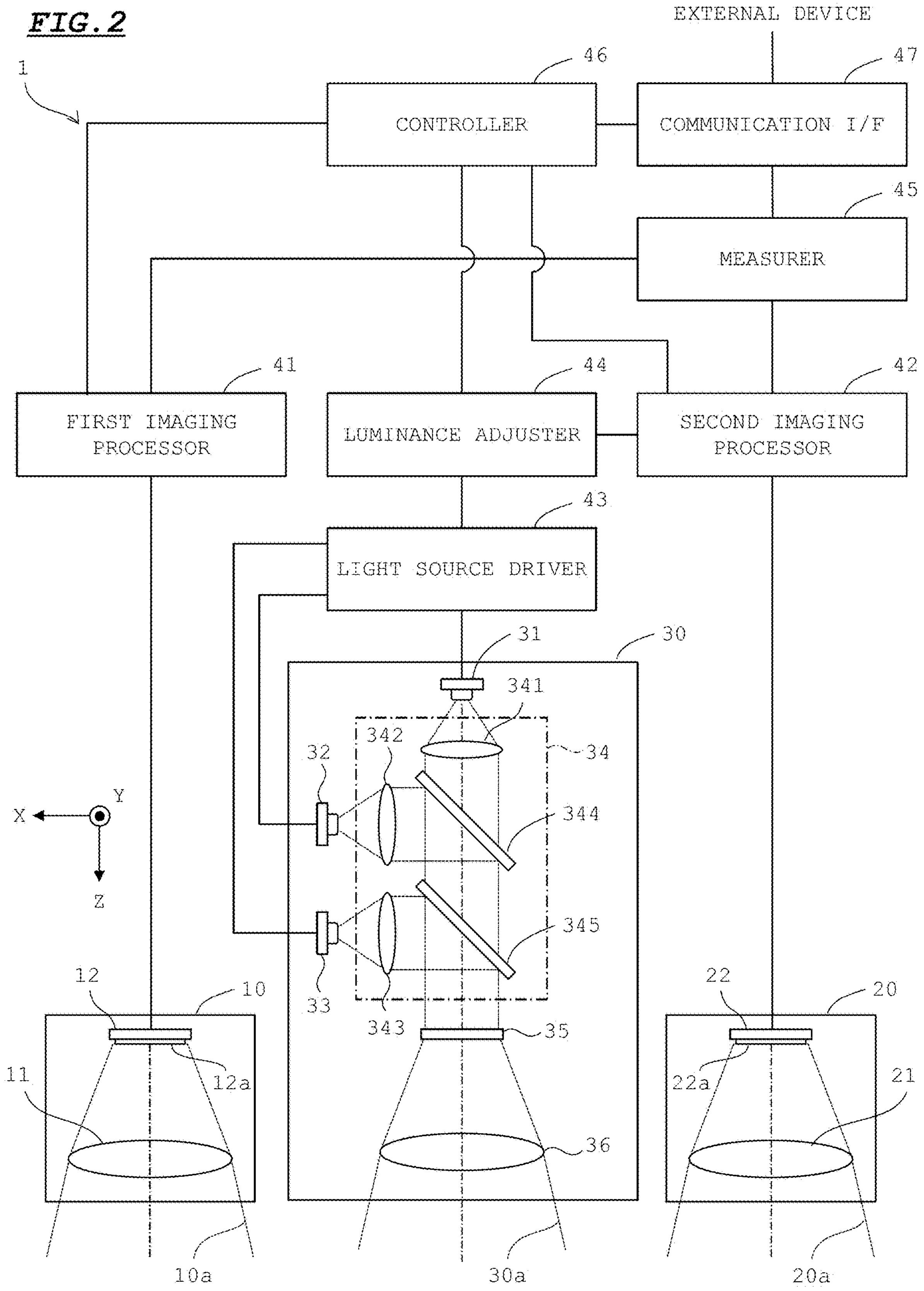
FIG. 2 is a diagram showing a configuration of the distance measuring device according to the embodiment.

FIG. 2 is a diagram showing a configuration of the distance measuring device 1.

The first imager 10 includes an imaging lens 11 and an imaging element 12. The imaging lens 11 condenses light from the field of view 10*a* onto an imaging surface 12*a* of the imaging element 12. The imaging lens 11 need not necessarily be a single lens, and may be configured as a combination of a plurality of lenses. The imaging element 12 is a monochrome image sensor. The imaging element 12 is a CMOS image sensor, for example. The imaging element 12 may be a CCD.

The second imager 20 has the same configuration as that of the first imager 10. The second imager 20 includes an imaging lens 21 and an imaging element 22. The imaging lens 21 condenses light from the field of view 20*a* onto an imaging surface 22*a* of the imaging element 22. The imaging lens 21 need not necessarily be a single lens, and may be configured as a combination of a plurality of lenses. The imaging element 22 is a monochrome image sensor. The imaging element 22 is a CMOS image sensor, for example. The imaging element 22 may be a CCD.

The projector 30 includes light sources 31 to 33, an optical system 34, a filter 35, and a projection lens 36.

The light sources 31 to 33 emit lights in wavelength bands different from each other. For example, the light source 31 emits light in a wavelength band near orange, the light source 32 emits light in a wavelength band near green, and the light source 33 emits light in a wavelength band near blue. The light sources 31 to 33 are each a light-emitting diode. The light sources 31 to 33 may each be a light source of another type such as a semiconductor laser.

The optical system 34 includes collimator lenses 341 to 343 and dichroic mirrors 344, 345.

The collimator lenses 341 to 343 convert the lights emitted from the light sources 31 to 33 into substantially collimated lights, respectively. The dichroic mirror 344 allows the light incident from the collimator lens 341 to be transmitted therethrough, and reflects the light incident from the collimator lens 342. The dichroic mirror 345 allows the light incident from the dichroic mirror 344 to be transmitted therethrough, and reflects the light incident from the collimator lens 343. Accordingly, the lights respectively emitted from the light sources 31 to 33 are integrated to be guided to the filter 35.

The filter 35 generates, from the lights in the respective wavelength bands guided from the optical system 34, the pattern light 30*a* in which a plurality of types of light regions having wavelength bands different from each other are distributed in a predetermined pattern. The configuration and action of the filter 35 will be described later with reference to FIGS. 5A, 5B.

The projection lens 36 projects the pattern light 30*a* generated by the filter 35. The projection lens 36 need not necessarily be a single lens, and may be configured as a combination of a plurality of lenses.

The distance measuring device 1 includes, as components of circuitry, a first imaging processor 41, a second imaging processor 42, a light source driver 43, a luminance adjuster 44, a measurer 45, a controller 46, and a communication interface 47.

The first imaging processor 41 and the second imaging processor 42 control the imaging elements 12, 22, and perform processing such as luminance correction and camera calibration on pixel signals of a first image and a second image outputted from the imaging elements 12, 22, respectively.

The light source driver 43 drives the light sources 31 to 33 at drive current values set by the luminance adjuster 44, respectively.

The luminance adjuster 44 sets drive current values of the light sources 31 to 33 to the light source driver 43, based on a pixel signal (luminance) of the second image inputted from the second imaging processor 42. More specifically, the luminance adjuster 44 sets drive current values (light emission amounts) of the light sources 31 to 33 such that the maximum luminances based on the lights from the light sources 31 to 33 acquired based on a pixel signal from the second imager 20 are different from each other. The processing performed by the luminance adjuster 44 will be described later with reference to FIG. 11.

The measurer 45 compares and processes the first image and the second image respectively inputted from the first imaging processor 41 and the second imaging processor 42, and performs the stereo correspondence point search to acquire the distance to the surface of the object A1 with respect to each pixel block on the first image. The measurer 45 transmits the acquired distance information on all of the pixel blocks to an external device via the communication interface 47.

That is, the measurer 45 sets on the first image a pixel block (hereinafter, referred to as "target pixel block") for distance acquisition target, and searches for a pixel block corresponding to this target pixel block, i.e., a pixel block (hereinafter, referred to as "matching pixel block") that best matches the target pixel block, in a search range defined on the second image. Then, the measurer 45 performs a process of acquiring a pixel deviation amount between a pixel block (hereinafter, referred to as "standard pixel block") at the same position as the target pixel block on the second image and the matching pixel block extracted from the second image by the above search, and calculating the distance to the surface of the object A1 at the position of the target pixel block, from the acquired pixel deviation amount.

The measurer 45 and the communication interface 47 may each be configured by a semiconductor integrated circuit composed of an FPGA (Field Programmable Gate Array). Alternatively, these components may each be configured by another semiconductor integrated circuit such as a DSP (Digital Signal Processor), a GPU (Graphics Processing Unit), and an ASIC (Application Specific Integrated Circuit).

The controller 46 is configured by a microcomputer or the like, and controls each component according to a predetermined program stored in an internal memory.

Figure 3A:
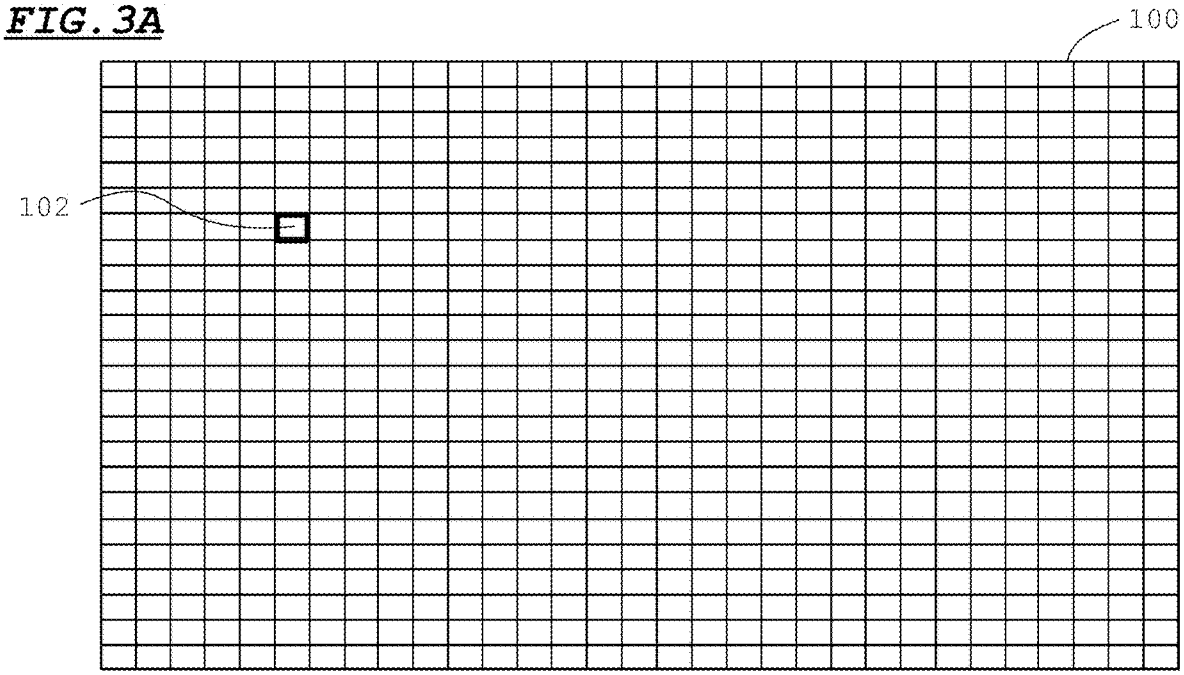
FIG. 3A and FIG. 3B are each a diagram schematically showing a method for setting a pixel block for a first image according to the embodiment.
Figure 3B:
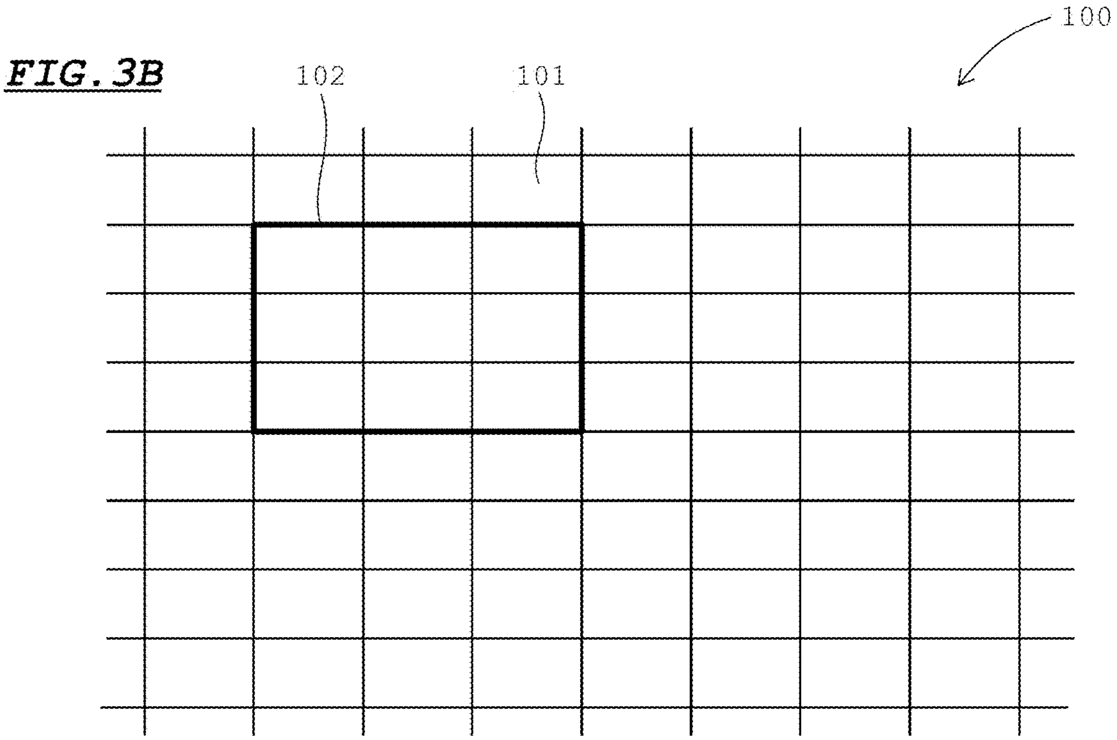

FIGS. 3A, 3B are each a diagram schematically showing a method for setting a pixel block 102 for a first image 100. FIG. 3A shows a method for setting the pixel block 102 for the entire first image 100, and FIG. 3B shows a partial region of the first image 100 in an enlarged manner.

As shown in FIGS. 3A, 3B, the first image 100 is divided into a plurality of the pixel blocks 102 each including a predetermined number of pixel regions 101. Each pixel region 101 is a region corresponding to one pixel on the imaging element 12. That is, the pixel region 101 is the smallest unit of the first image 100. In the example in FIGS. 3A, 3B, one pixel block 102 is composed of nine pixel regions 101 arranged in three rows and three columns. However, the number of the pixel regions 101 included in one pixel block 102 is not limited thereto.

Figure 4A:
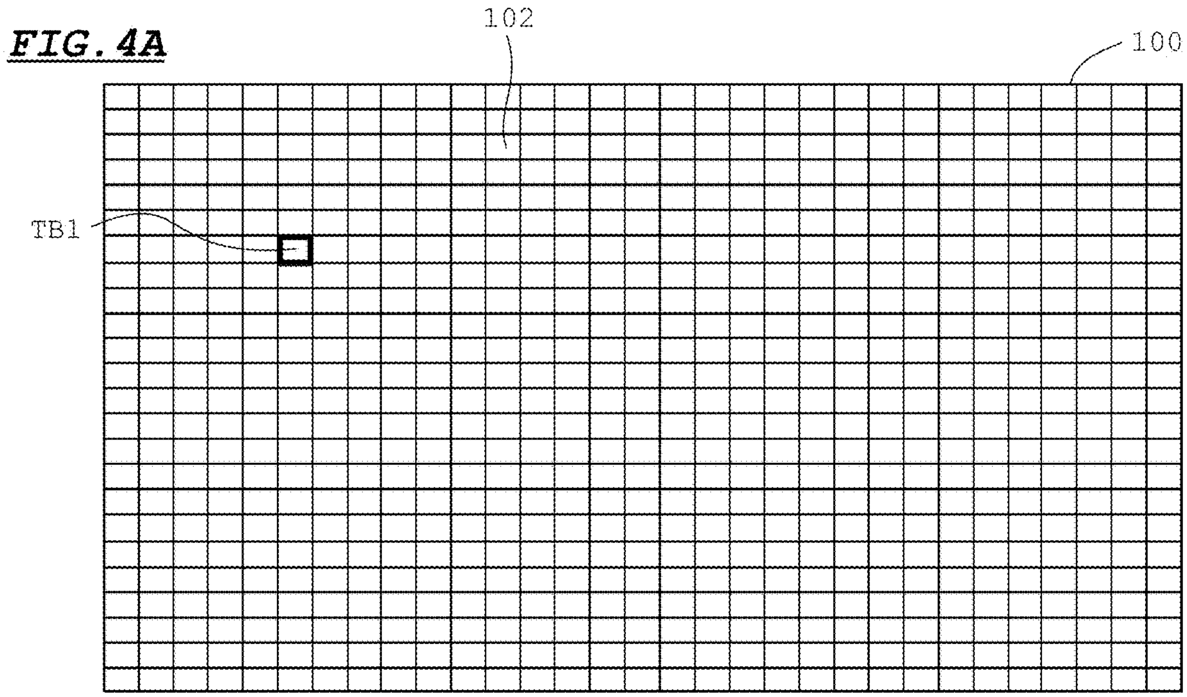
FIG. 4A is a diagram schematically showing a state where a target pixel block is set on the first image according to the embodiment.
Figure 4B:
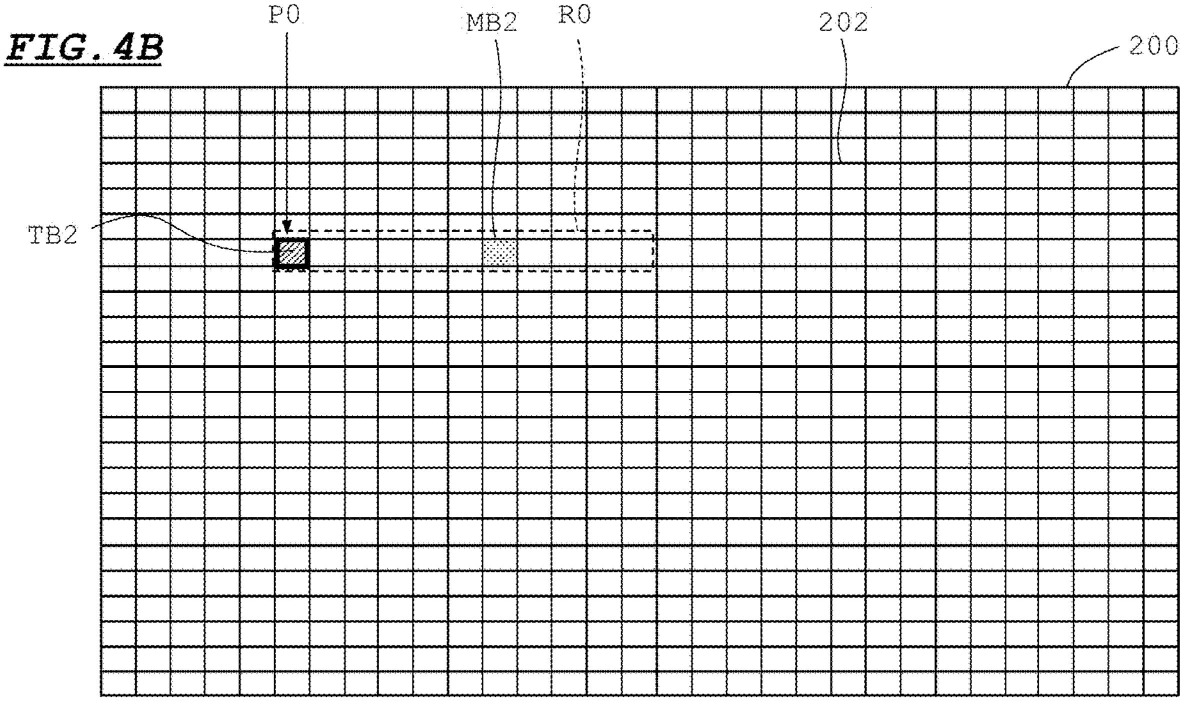
FIG. 4B is a diagram schematically showing a search range set on a second image for searching for the target pixel block in FIG. 4A according to the embodiment.

FIG. 4A is a diagram schematically showing a state where a target pixel block TB1 is set on the first image 100, and FIG. 4B is a diagram schematically showing a search range R0 set on a second image 200 for searching for the target pixel block in FIG. 4A.

In FIG. 4B, for convenience, similar to the first image 100, the second image 200 acquired from the second imager 20 is divided into a plurality of pixel blocks 202. Each pixel block 202 includes pixel regions the number of which is the same as that in the pixel block 102 described above.

In FIG. 4A, the target pixel block TB1 is a pixel block 102 to be processed among the pixel blocks 102 on the first image 100. In addition, in FIG. 4B, a standard pixel block TB2 is a pixel block 202, on the second image 200, at the same position as the target pixel block TB1.

The measurer 45 in FIG. 2 identifies the standard pixel block TB2 at the same position as the target pixel block TB1, on the second image 200. Then, the measurer 45 sets the position of the identified standard pixel block TB2 as a standard position P0 of the search range R0, and sets a range extending from this standard position P0 in the direction of separation between the first imager 10 and the second imager 20, as the search range R0.

The direction in which the search range R0 extends is set to a direction in which the pixel block (matching pixel block MB2) corresponding to the target pixel block TB1 deviates from standard position P0 on the second image 200 due to a parallax. Here, the search range R0 is set as a range of 12 pixel blocks 202 aligned in the right direction (direction corresponding to the X-axis direction in FIG. 1) from the standard position P0. However, the number of the pixel blocks 202 included in the search range R0 is not limited to this number. In addition, the starting point of the search range R0 is not limited to the standard pixel block TB2, and for example, a position shifted from the standard pixel block TB2 in the right direction by several blocks may be set as the starting point of the search range R0.

The measurer 45 searches for the pixel block (matching pixel block MB2) corresponding to the target pixel block TB1, in the search range R0 set as described above. Specifically, while shifting the search position one pixel by one pixel from the standard pixel block TB2 in the right direction, the measurer 45 calculates a correlation value between the target pixel block TB1 and each search position. As the correlation value, SSD or SAD is used, for example. Then, the measurer 45 identifies, as the matching pixel block MB2, the pixel block at the search position having the highest correlation on the search range R0.

Further, the measurer 45 acquires a pixel deviation amount of the matching pixel block MB2 with respect to the standard pixel block TB2. Then, the measurer 45 calculates the distance to the surface of the object A1 by a triangulation method from the acquired pixel deviation amount and the separation distance between the first imager 10 and the second imager 20. The measurer 45 executes the same process on all of the pixel blocks 102 (the target pixel block TB1) on the first image 100. Then, when the distances have been acquired for all of the pixel blocks 102, the measurer 45 transmits these pieces of distance information to the external device via the communication interface 47.

The distance measuring device 1 having the above configuration is fixed to be used, or in another case, is installed at an end effector (e.g., gripper) of a robot arm that works in a plant, for example. In this case, the controller 46 of the distance measuring device 1 receives an instruction of distance acquisition from a robot controller via the communication interface 47, in a work step of the robot arm. In accordance with this instruction, the controller 46 causes the measurer 45 to measure the distance between the position of the end effector and the surface of the object A1 as the work target, and transmits the measurement result to the robot controller via the communication interface 47. The robot controller performs feedback control of the operation of the end effector, based on the received distance information. Thus, when the distance measuring device 1 is installed at an end effector, the distance measuring device 1 is desirably small in size and light in weight.

Figure 5A:
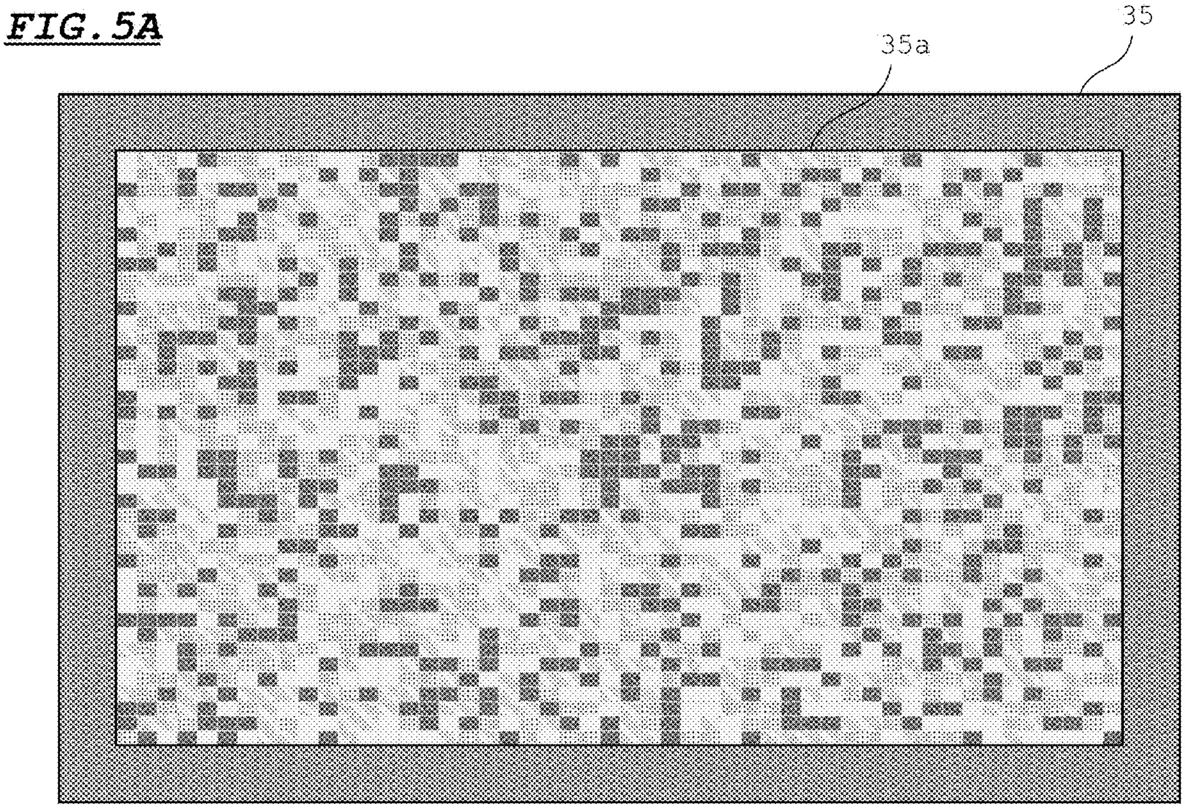
FIG. 5A is a diagram schematically showing a configuration of a filter according to the embodiment.
Figure 5B:
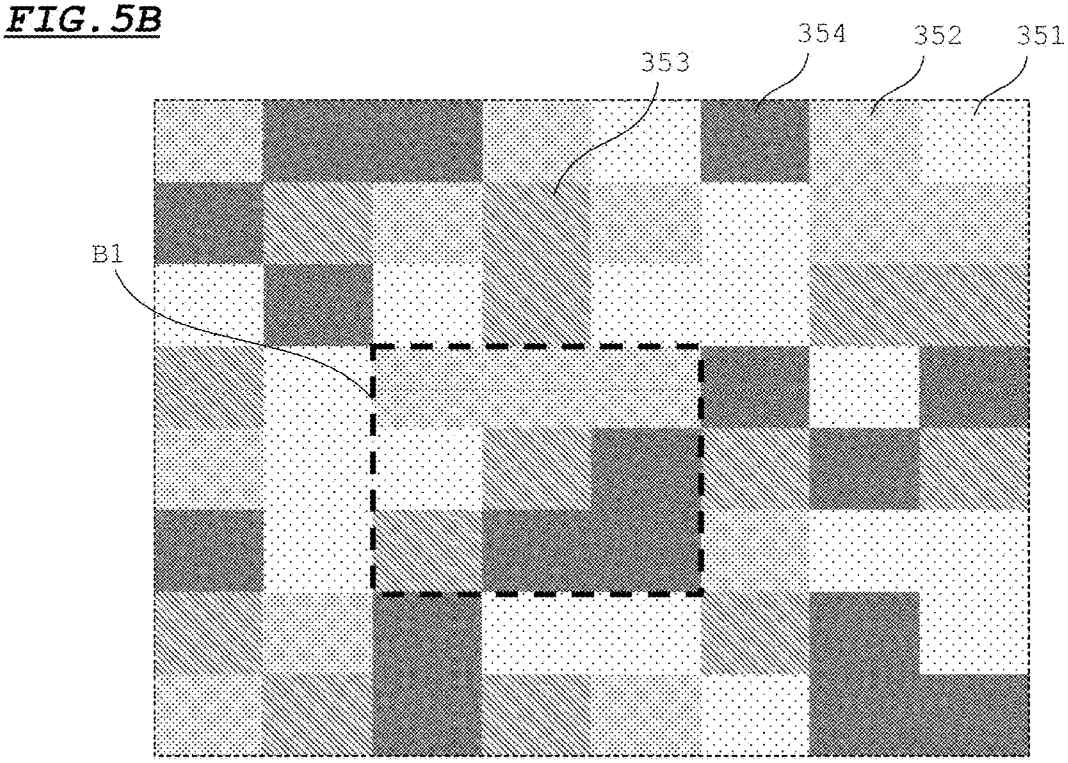
FIG. 5B is a diagram showing a partial region of the filter in an enlarged manner according to the embodiment.

FIG. 5A is a diagram schematically showing a configuration of the filter 35 in FIG. 2. FIG. 5B is a diagram showing a partial region of FIG. 5A in an enlarged manner. FIGS. 5A, 5B each show a state of the filter 35 viewed from the side of an incident surface 35*a* of light.

As shown in FIGS. 5A, 5B, on the incident surface 35*a* of the filter 35, a plurality of types of filter regions 351 to 354 are formed in a predetermined pattern. In FIGS. 5A, 5B, the types of the filter regions 351 to 354 are indicated by hatchings of types different from each other. The filter regions 351 to 353 selectively allow lights in wavelength bands different from each other to be transmitted therethrough. Here, the transmission wavelength bands of the filter regions 351 to 353 correspond to the wavelength bands of lights emitted from the light sources 31 to 33, respectively.

That is, the filter region 351 mainly has a high transmittance with respect to the wavelength band of the light from the light source 31 and a low transmittance with respect to the other wavelength bands. The filter region 352 mainly has a high transmittance with respect to the wavelength band of the light from the light source 32 and a low transmittance with respect to the other wavelength bands. The filter region 353 mainly has a high transmittance with respect to the wavelength band of the light from the light source 33 and a low transmittance with respect to the other wavelength bands.

As for the filter region 354, the transmittance is set to be low with respect to all of the wavelength bands of the lights from the light sources 31 to 33. That is, the filter region 354 substantially blocks the lights from the light sources 31 to 33.

The size of each of the filter regions 351 to 354 is set to a size substantially corresponding to one pixel on the imaging elements 12, 22, for example. For example, a region B1 indicated by a broken line in FIG. 5B is a region corresponding to the region of a pixel block (the pixel block 102, 202 to be used in the stereo correspondence point search described above) composed of vertically arranged three pixels and horizontally arranged three pixels on the imaging elements 12, 22. That is, when the distance D0 to the surface of the object A1 is a standard distance (e.g., an intermediate distance in a distance measurement range), the light in this region B1 is projected in the region of a pixel block composed of vertically arranged three pixels and horizontally arranged three pixels on the imaging elements 12, 22.

However, the size of each of the filter regions 351 to 354 is not necessarily limited to the size corresponding to one pixel. The size of each of the filter regions 351 to 354 may be larger, or may be smaller, than the size corresponding to one pixel. In FIG. 5B, each of the filter regions 351 to 354 is rectangular and has the same size with each other. However, the sizes of the respective filter regions 351 to 354 may be different from each other, and the shapes thereof may be another shape such as a square or a circle.

Preferably, the filter regions 351 to 354 are provided such that, in the regions B1 corresponding to all of the pixel blocks that are used in the stereo correspondence point search, filter regions of types different from each other are included, and further preferably, such that the filter regions 351 to 354 of all the types are included in these regions B1. In addition, preferably, the provision pattern of the filter regions included in the region B1 corresponding to a pixel block is specific (random) for each pixel block at each search position, at least in the search range R0 in the stereo correspondence point search.

When the filter regions 351 to 354 are provided in this manner, if the luminances of the lights having passed through the filter regions 351 to 354 are made different from each other as described later, the luminance distribution of the lights in the pixel block can be made specific for each pixel block. Accordingly, accuracy of the stereo correspondence point search can be enhanced, and as a result, accuracy of distance measurement can be enhanced.

The filter regions 351 to 354 are formed through the steps below, for example.

First, on the surface of a transparent glass substrate, a color resist for forming the filter region 351 is applied. Next, in a state where the region other than the filter region 351 is masked, an ultraviolet ray is applied, to insolubilize the color resist in the region corresponding to the filter region 351. Upon completion of the insolubilization, the mask is removed, and unnecessary color resist is removed by an alkaline developing liquid. Then, a post bake process is performed to cure the color resist at the filter region 351. Accordingly, the filter region 351 is formed on the glass substrate.

The above step is sequentially performed with respect to the filter regions 352 to 354. Accordingly, the filter regions 352 to 354 are sequentially formed on the glass substrate. In this manner, all of the filter regions 351 to 354 are formed on the glass substrate. Then, a protection film is formed on the surface of the filter regions 351 to 354. Accordingly, formation of the filter 35 is completed.

FIGS. 6A, 6B and FIGS. 7A, 7B are diagrams schematically showing light regions of lights respectively having passed through the filter regions 351 to 354 when lights from the light sources 31 to 33 are incident on the entire range shown in FIG. 5B.

FIG. 6A shows a distribution state of light (dot light DT1) having been transmitted through the filter region 351 in FIG. 5B, and FIG. 6B shows the distribution of light (dot light DT2) having been transmitted through the filter region 352 in FIG. 5B. FIG. 7A shows a distribution state of light (dot light DT3) having been transmitted through the filter region 353 in FIG. 5B, and FIG. 7B shows a distribution state of a region (lightless dot DT4) where light is shielded by the filter region 354 in FIG. 5B.

From the region in FIG. 5B, the dot lights DT1 to DT3 and the lightless dot DT4 in FIG. 6A to FIG. 7B are integrated to be projected. From the other region of the filter 35 as well, the dot lights DT1 to DT3 and the lightless dot DT4 are projected in a distribution according to the distribution of the filter regions 351 to 354. Then, the dot lights DT1 to DT3 and the lightless dot DT4 projected from the filter 35 are applied, as the pattern light 30*a*, to the surface of the object A1. Then, the dot lights DT1 to DT3 and the lightless dot DT4 are reflected by the surface of the object A1, and then, taken into the first imager 10 and the second imager 20. Accordingly, the first image 100 and the second image 200 in which the dot lights DT1 to DT3 and the lightless dot DT4 are projected are acquired.

Here, the light emission amounts of the light sources 31 to 33 are set such that the maximum luminances of the dot lights DT1 to DT3 and the lightless dot DT4 on the second image 200 are different from each other. More specifically, the light emission amounts of the light sources 31 to 33 are set such that the maximum luminances of the dot lights DT1 to DT3 and the lightless dot DT4 on the second image 200 are approximately evenly different in the order of the magnitude of luminance.

FIGS. 8A to 8E are diagrams for describing a method for setting the light emission amounts of the light sources 31 to 33.

Figure 8A:
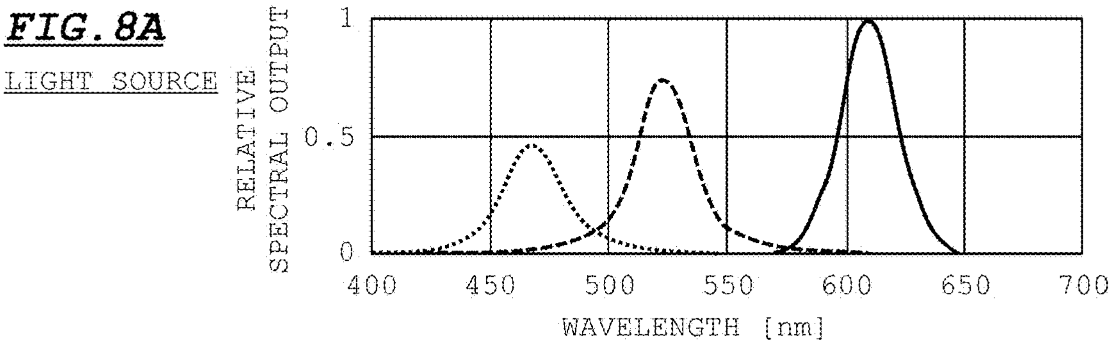
FIG. 8A to FIG. 8D are respectively graphs showing various types of spectral characteristics according to the embodiment.

FIG. 8A is a graph showing spectral outputs of the light sources 31 to 33. The spectral outputs of the light sources 31 to 33 are indicated by a solid line, a dotted line, and a broken line, respectively. Here, the vertical axis of the graph has been normalized based on the maximum output of the light source 31.

The light source 31 emits light having a center wavelength of around 610 nm and an emission bandwidth of about 80 nm. The light source 32 emits light having a center wavelength of around 520 nm and an emission bandwidth of about 150 nm. The light source 33 emits light having a center wavelength of around 470 nm and an emission bandwidth of about 100 nm.

Figure 8B:
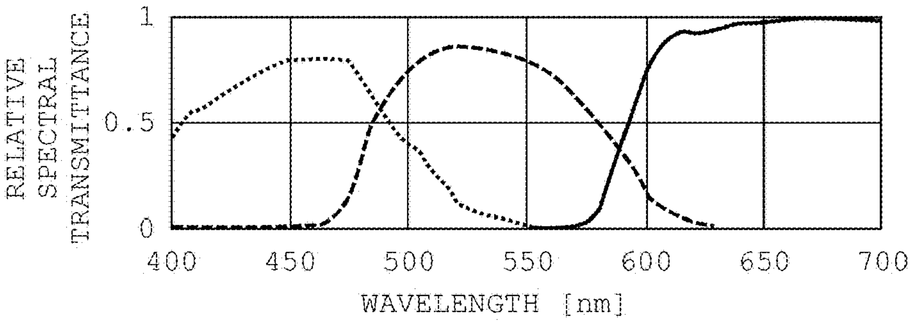

FIG. 8B is a graph showing spectral transmittances of the filter regions 351 to 353. The spectral transmittances of the filter regions 351 to 353 are indicated by a solid line, a dotted line, and a broken line, respectively. Here, the vertical axis of the graph has been normalized based on the maximum transmittance of the filter region 351.

With respect to the filter region 351, the transmittance increases in association with increase in the wavelength from around 570 nm, and the maximum transmittance is maintained at about 650 nm or more. The filter region 352 has a spectral characteristic in which the maximum transmittance is at around 520 nm and the transmission bandwidth is about 150 nm. The filter region 353 has a spectral characteristic in which the maximum transmittance is at around 460 nm and the transmission bandwidth is about 150 nm.

The spectral transmittance of the filter region 354 is not shown. The spectral transmittance of the filter region 354 is substantially zero around the emission bands (here, 400 to 650 nm) of the light sources 31 to 33.

Figure 8C:
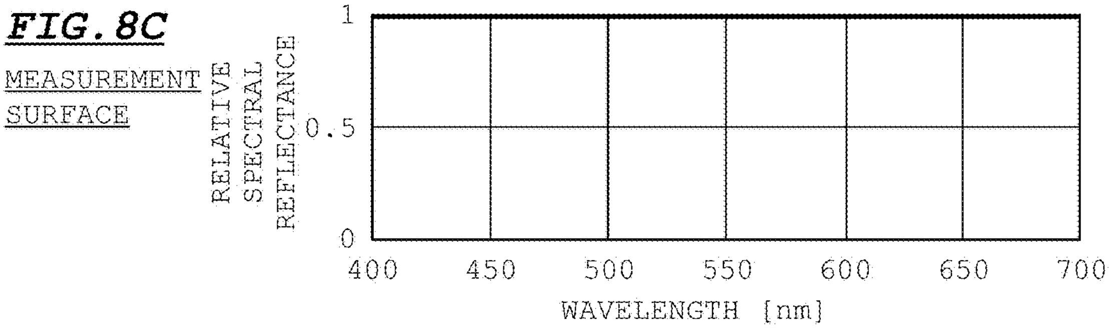

FIG. 8C is a graph showing the spectral reflectance of the surface of the object A1 being the measurement surface. Here, a case where the reflectance of the measurement surface is constant regardless of the wavelength, i.e., a case where the reflectance of the measurement surface does not have wavelength dependency, is shown as an example. The vertical axis of the graph has been normalized based on the maximum reflectance.

Figure 8D:
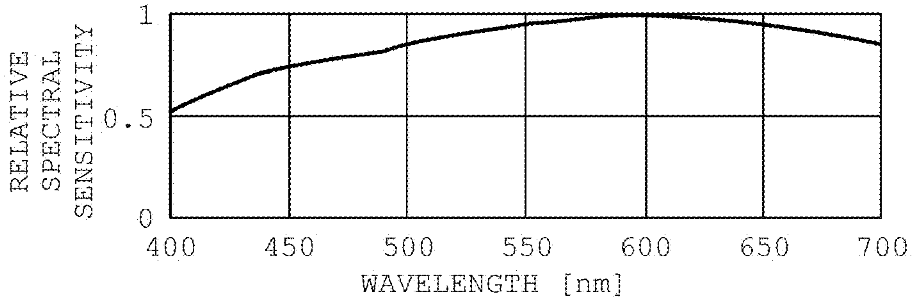

FIG. 8D is a graph showing the spectral sensitivity of the first imager 10 and the second imager 20. The spectral sensitivity of the first imager 10 and the second imager 20 is mainly determined by the spectral transmittance of the imaging lenses 11, 21 and the spectral sensitivity of the imaging elements 12, 22. The vertical axis of the graph has been normalized based on the maximum sensitivity. Here, the spectral sensitivity is at the maximum at around 600 nm.

Figure 8E:
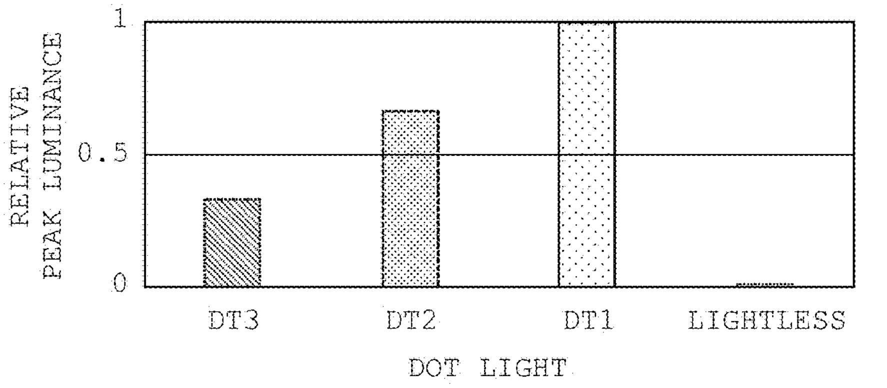
FIG. 8E is a graph showing the maximum luminance of each dot light according to the embodiment.

FIG. 8E is a graph showing the maximum luminances of the dot lights DT1 to DT3 and the lightless dot DT4 in the second image 200 when the spectral outputs of the light sources 31 to 33, the spectral transmittances of the filter regions 351 to 354, the spectral reflectance of the measurement surface (the surface of the object A1), and the spectral sensitivity of the first imager 10 and the second imager 20 respectively have the characteristics in FIGS. 8A to 8D. Here, the vertical axis of the graph has been normalized based on the maximum luminance of the dot light DT1.

In this case, the maximum luminance of the dot light DT3 is about ⅓ of the maximum luminance of the dot light DT1, and the maximum luminance of the dot light DT2 is about ⅔ of the maximum luminance of the dot light DT1. That is, when the reflectance of the measurement surface does not have wavelength dependency, if the peak values of the spectral outputs of the light sources 31 to 33 are set as in FIG. 8A, the maximum luminances of the dot lights DT1 to DT3 based on the lights from the light sources 31 to 33 can be made approximately evenly different in the order of the magnitude of luminance.

The luminance adjuster 44 in FIG. 2 performs initial setting, as described above, of the light emission amounts (drive current values) of the light sources 31 to 33 such that the maximum luminances of the dot lights DT1 to DT3 based on the lights from the light sources 31 to 33 are approximately evenly different in the order of the magnitude of luminance. Accordingly, if the reflectance of the measurement surface (the surface of the object A1) does not have wavelength dependency, the maximum luminances of the dot lights DT1 to DT3 on the first image 100 and the second image 200 have a substantially even gradation difference. Therefore, during the above-described stereo correspondence point search, a correlation value that remarkably peaks at the search position of the matching pixel block MB2 is calculated. Therefore, the position of the matching pixel block MB2 can be accurately identified, and as a result, distance measurement can be accurately performed.

On the other hand, when the light emission amounts (drive current values) of the light sources 31 to 33 have been initially set as described above, if the reflectance of the measurement surface (the surface of the object A1) has wavelength dependency, the maximum luminances of the dot lights DT1 to DT3 on the first image 100 and the second image 200 do not have a substantially even gradation difference.

Figure 9A:
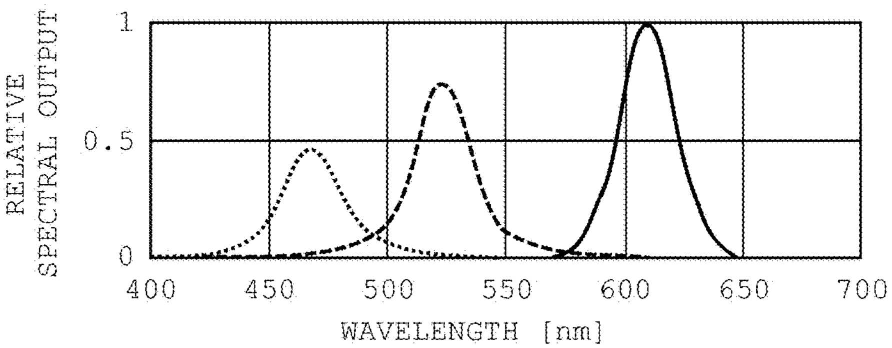
FIG. 9A to FIG. 9D are respectively graphs showing various types of spectral characteristics according to the embodiment.
Figure 9B:
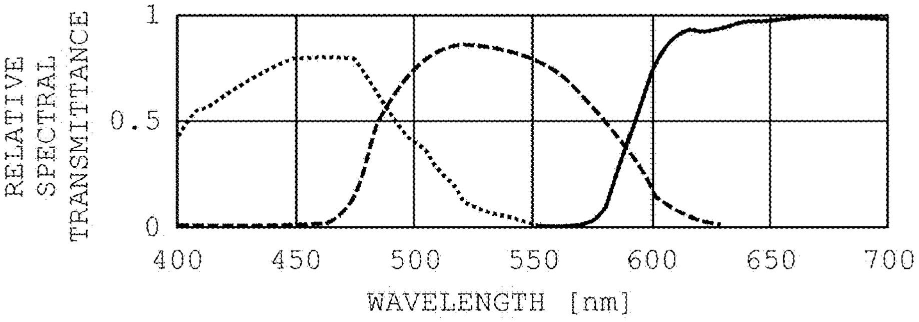
Figure 9C:
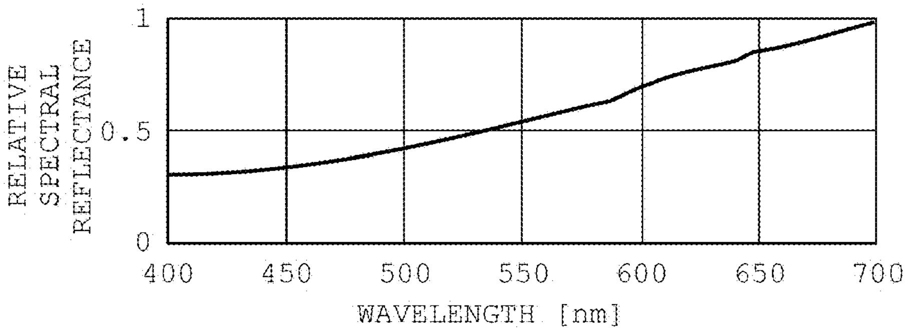
Figure 9D:
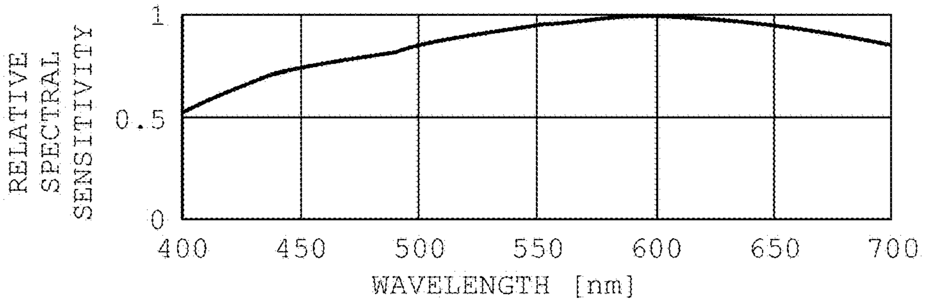
Figure 9E:
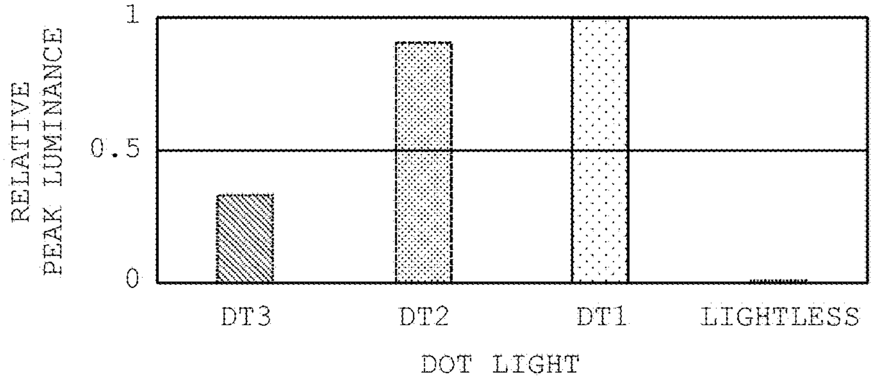
FIG. 9E is a graph showing the maximum luminance of each dot light according to the embodiment.

FIG. 9C is a graph showing the spectral reflectance of the reflectance of the measurement surface when the reflectance of the measurement surface (the surface of the object A1) has wavelength dependency, and FIG. 9E is a graph showing the maximum luminances of the dot lights DT1 to DT3 and the lightless dot DT4 in the second image 200 in this case. FIGS. 9A, 9B, 9D are the same as FIGS. 8A, 8B, 8D.

When the reflectance of the measurement surface has the spectral reflectance as shown in FIG. 9C, if the light sources 31 to 33 have spectral outputs as shown in FIG. 9A, the gradation difference between the maximum luminance of the dot light DT2 and the maximum luminance of the dot light DT1 becomes small as shown in FIG. 9E. Therefore, in the second image 200, the region of the dot light DT1 and the region of the dot light DT2 are less likely to be distinguished from each other according to the luminances, and these regions are more likely to be integrated into one region to be detected. Therefore, correspondingly, the specificity of the dot distribution in each pixel block decreases, and the search accuracy in the stereo correspondence point search decreases.

However, in this case, although the specificities due to the dot lights DT1, DT2 in the pixel block decrease, the specificity due to the dot light DT3 is maintained. Even if the regions of the dot lights DT1, DT2 are integrated into one region as mentioned above, the pixel position where this region is distributed in each pixel block is more likely to be different between pixel blocks. Therefore, in this case as well, the specificity of the dot pattern in each pixel block is easily maintained. Therefore, in this case as well, if each light source is driven at the initial set value, the search accuracy in the stereo correspondence point search can be maintained to be high.

In order to more accurately perform the stereo correspondence point search, when the reflectance of the measurement surface has wavelength dependency as above, it is preferable that the light emission amounts (drive current values) of the light sources 31 to 33 are changed from the initial set values in accordance with the spectral reflectance of the reflectance of the measurement surface, to ensure the luminance difference in the maximum luminances between dot lights.

Figure 10A:
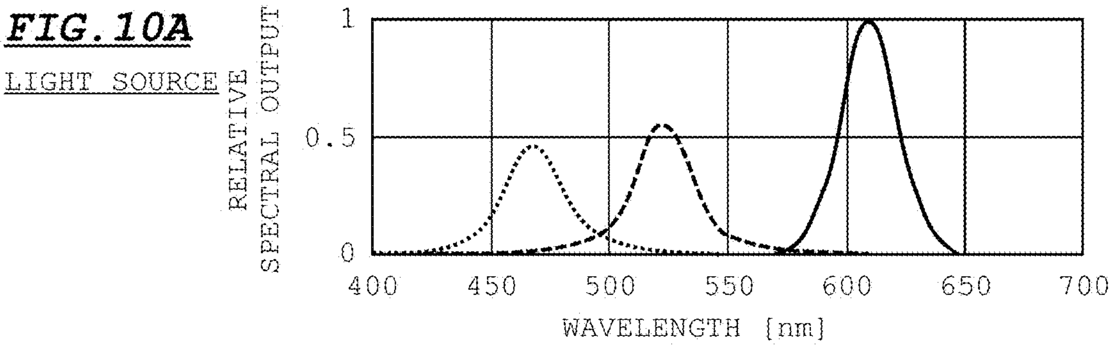
FIG. 10A to FIG. 10D are respectively graphs showing various types of spectral characteristics according to the embodiment.
Figure 10B:
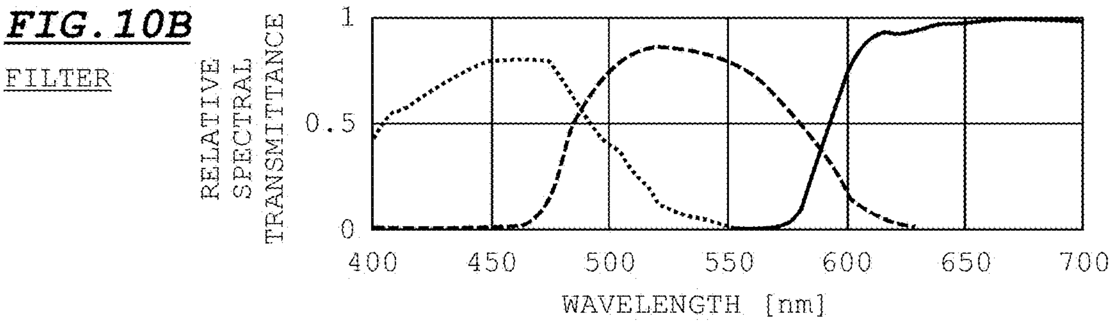
Figure 10C:
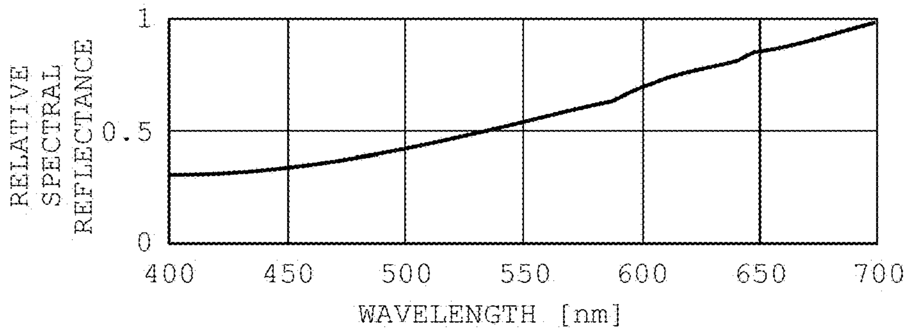
Figure 10D:
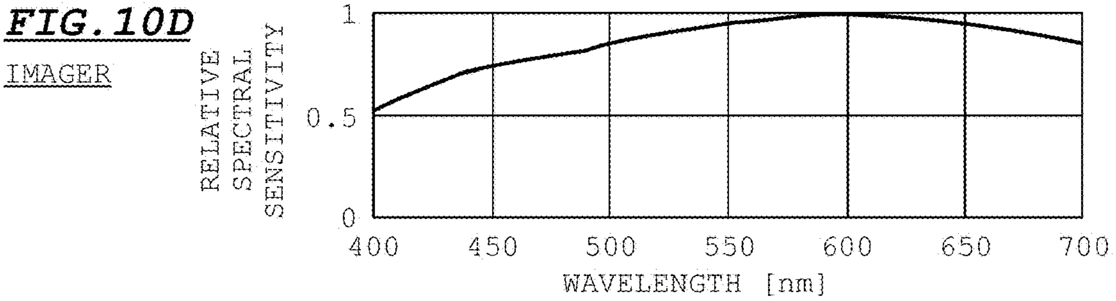

FIG. 10A is a graph showing a method for adjusting the outputs of the light sources 31 to 33 in this case. FIGS. 10B to 10D are the same as FIGS. 9B to 9D.

Figure 10E:
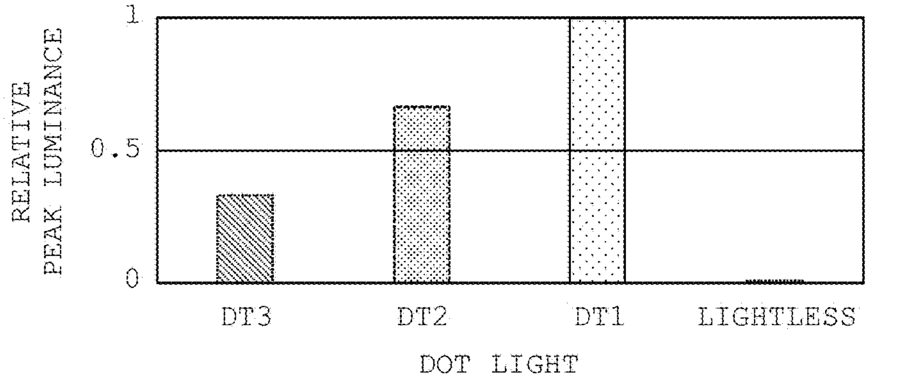
FIG. 10E is a graph showing the maximum luminance of each dot light according to the embodiment.

Here, the light emission amount (drive current value) of the light source 32 is set to be lower than that in the case of FIG. 9A. Accordingly, as shown in FIG. 10E, the maximum luminance of the dot light DT2 decreases, and the gradation difference in luminance between the dot light DT1 and the dot light DT2 is ensured as in the case of FIG. 8E. Accordingly, the maximum luminances of the dot lights DT1 to DT3 based on the lights from the light sources 31 to 33 become approximately evenly different in the order of the magnitude of luminance.

Accordingly, the specificity of the pattern of the dot lights DT1 to DT3 and the lightless dot DT4 in each pixel block is maintained as in the case of FIG. 8E. Therefore, the stereo correspondence point search can be accurately performed.

Figure 11:
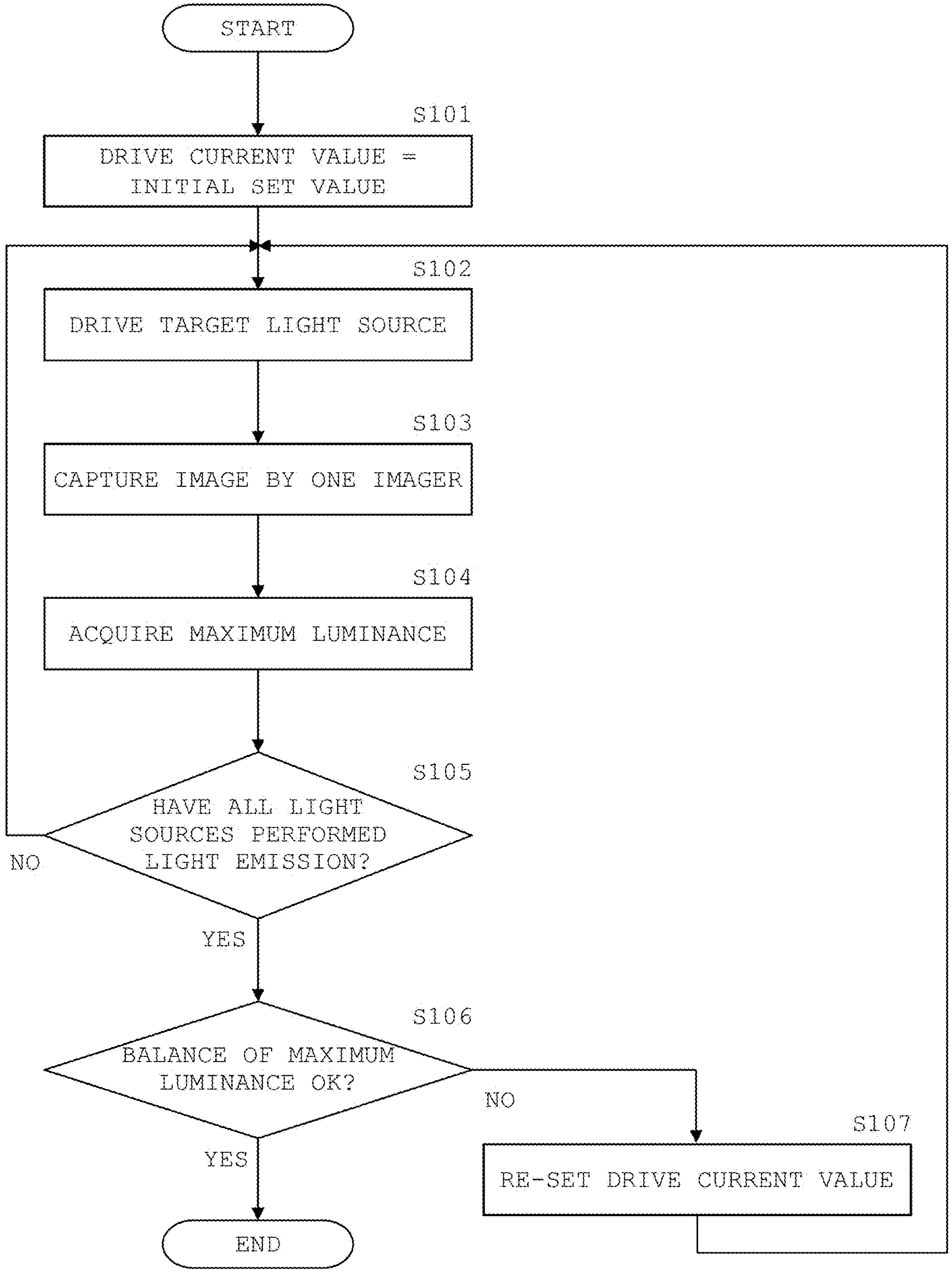
FIG. 11 is a flowchart showing a setting process of a light emission amount (drive current) of each light source according to the embodiment.

FIG. 11 is a flowchart showing a setting process of light emission amounts (drive currents) of the light sources 31 to 33. This process is performed by the luminance adjuster 44 shown in FIG. 2, before an actual distance measurement on the object A1 is performed.

The luminance adjuster 44 sets the drive current values of the light sources 31 to 33 to initial set values (S101). The initial set value of each light source is set such that, when the reflectance of the surface of the object A1 does not have wavelength dependency, the maximum luminances based on the lights from the light sources 31 to 33 are approximately evenly different in the order of the magnitude of luminance, as in FIG. 8E. In addition, the initial set value of each light source is set such that, when the reflectance of the surface of the object A1 has a predetermined value (a normal value that is assumed), the maximum luminances based on the lights from the light sources 31 to 33 appropriately fall within the range of gradation (e.g., 0 to 255) defining the luminance in the first imaging processor 41 and the second imaging processor 42. For example, the initial set value of each light source is set such that the largest maximum luminance of the light source 31 becomes slightly smaller (e.g., about 80 to 90% of the maximum gradation) than the maximum gradation in the range of gradation defining the luminance.

Next, the luminance adjuster 44 sets one of the light sources 31 to 33 to be a target light source, and drives this light source at a drive current value set for this light source (S102). For example, the light source 31 is set to be the target light source. Then, in a state where only the target light source is caused to emit light, the luminance adjuster 44 causes one of the first imager 10 and the second imager 20 to perform image capturing (S103). In the present embodiment, image capturing in step S103 is performed by the second imager 20.

The luminance adjuster 44 acquires the maximum luminance of the pixels from the captured image (S104). Here, the image capturing is performed by the second imager 20, and the luminance adjuster 44 acquires the maximum luminance of the pixels from the second image 200 acquired by the second imager 20. Accordingly, on the second image 200, the luminance that is the maximum out of the luminances outputted from the pixels on which the dot light (here, the dot light DT1) from the target light source (the light source 31) is incident, is acquired.

Then, the luminance adjuster 44 determines whether or not the processes in steps S102 to S104 have been performed with respect to all of the light sources 31 to 33 (S105). When a light source not subjected to the processes remains (S105: NO), the luminance adjuster 44 sets the next light source to be the target light source, and drives this light source at an initial set value (current value) corresponding to this light source (S102). For example, the light source 32 is set to be the target light source. Then, the luminance adjuster 44 performs the processes in steps S103, S104 in the same manner, and acquires the maximum luminance of the pixels from the second image 200. Accordingly, on the second image 200, the luminance that is the maximum out of the luminances outputted from the pixels on which the dot light (here, the dot light DT2) from the target light source (the light source 32) is incident, is acquired.

In this case as well, since an unprocessed light source (the light source 33) still remains (S105: NO), the luminance adjuster 44 sets the next light source to be the target light source, and drives this light source at an initial set value (current value) corresponding to this light source (S102). Accordingly, the last light source 33 is set to be the target light source. Then, the luminance adjuster 44 performs the processes in steps S103, S104 in the same manner, and acquires the maximum luminance of the pixels from the second image 200. Accordingly, on the second image 200, the luminance that is the maximum out of the luminances outputted from the pixels on which the dot light (here, the dot light DT3) from the target light source (the light source 33) is incident, is acquired.

Then, when the maximum luminance based on the initial set value has been acquired with respect to all of the light sources 31 to 33 (S105: YES), the luminance adjuster 44 determines whether or not the balance of the acquired maximum luminances is appropriate (S106). Specifically, the luminance adjuster 44 determines whether or not the maximum luminances acquired during light emission by the light sources 31 to 33 are approximately evenly different in the order of the magnitude of luminance, as in FIG. 8E.

That is, the luminance adjuster 44 determines whether or not the ratio of the maximum luminance (corresponding to the maximum luminance of the dot light DT2) acquired during light emission by the light source 32 relative to the maximum luminance (corresponding to the maximum luminance of the dot light DT1) acquired during light emission by the light source 31 is included in a predetermined allowable range having 66% as the center. Further, the luminance adjuster 44 determines whether or not the ratio of the maximum luminance (corresponding to the maximum luminance of the dot light DT3) acquired during light emission by the light source 33 relative to the maximum luminance (corresponding to the maximum luminance of the dot light DT1) acquired during light emission by the light source 31 is included in a predetermined allowable range having 33% as the center.

These allowable ranges are set to be ranges that allow maximum luminances adjacent to each other in the direction of magnitude to be distinguished from each other, i.e., ranges that allow, in the pixel block, the dot lights DT1 to DT3 to be distinguished from each other according to the luminances and the pattern of the dot lights DT1 to DT3 to maintain the specificity. For example, these allowable ranges are set to be a range about ±10% with respect to 66% and 33% described above.

When the maximum luminances acquired during light emission by the light sources 31 to 33 are approximately evenly different in the order of the magnitude of luminance as in FIG. 8E (S106: YES), the luminance adjuster 44 ends the process in FIG. 11. In this case, the actual distance measurement on the object A1 is performed by the light sources 31 to 33 being driven at the respective initial set values.

On the other hand, when the maximum luminances acquired during light emission by the light sources 31 to 33 are not approximately evenly different in the order of the magnitude of luminance (S106: NO), the luminance adjuster 44 executes a process or re-setting the drive current values of the light sources 31 to 33 (S107).

Specifically, the luminance adjuster 44 re-sets the drive current values of the light sources 31 to 33 such that: based on the relationship between the luminance and the drive current value possessed in advance, and the present respective maximum luminances, the maximum luminance based on light emission by the light source 31 becomes slightly smaller (e.g., about 80 to 90% of the maximum gradation) than the maximum gradation; and, relative to this maximum luminance, the maximum luminances based on light emission by the light source 32 and the light source 33 become around 66% and 33% being the above-described ratios.

At this time, the luminance adjuster 44 also determines whether or not any of these three maximum luminances acquired in step S104 is saturated, i.e., has reached the maximum gradation of the gradation (e.g., 0 to 255) defining the luminance. When one of the maximum luminances is saturated, the luminance adjuster 44 sets the drive current value for the light source from which this maximum luminance has been acquired, so as to be lower by a predetermined gradation than the drive current value obtained from the maximum gradation and the relationship between the luminance and the drive current value. In this case as well, the luminance adjuster 44 re-sets the drive current values of the light sources 31 to 33 such that the maximum luminances based on light emission by the light sources 31 to 33 are approximately evenly different in the order of the magnitude of luminance.

Then, after re-setting the drive current values for the light sources 31 to 33, the luminance adjuster 44 returns the process to step S102, and acquires the maximum luminance during light emission of each light source according to the re-set drive current value (S102 to S105). Then, the luminance adjuster 44 compares the three maximum luminances acquired again, and determines whether or not these maximum luminances are approximately evenly different in the order of the magnitude of luminance (S106).

When this determination is YES, the luminance adjuster 44 ends the process in FIG. 11. In this case, the actual distance measurement on the object A1 is performed by the light sources 31 to 33 being respectively driven at the re-set drive current values.

On the other hand, when the determination in step S106 is NO, the luminance adjuster 44, again as in the above, re-sets the drive current values for the light sources 31 to 33, based on the relationship between the luminance and the drive current value, from the three maximum luminances acquired this time (S107), and returns the process to step S102. The luminance adjuster 44 re-sets the drive current values of the light sources 31 to 33 until the maximum luminances respectively acquired based on the light emission by the light sources 31 to 33 become approximately evenly different in the order of the magnitude of luminance (S106: NO, S107). Then, when these maximum luminances become approximately evenly different in the order of the magnitude of luminance (S106: YES), the luminance adjuster 44 ends the process in FIG. 11. Accordingly, the light sources 31 to 33 are respectively driven at the drive current values finally set, and an actual distance measurement on the object A1 is performed.

Effects of Embodiment

According to the above embodiment, the following effects are exhibited.

As shown in FIG. 6A to FIG. 7A, the pattern light 30*a* in which a plurality of types of light regions (the dot lights DT1 to DT3) having wavelength bands different from each other are distributed in a predetermined pattern is projected onto the surface of the object A1. Therefore, even if the surface of the object A1 has a low reflectance or a high light absorption rate with respect to any of these wavelength bands, the pattern according to lights in the other wavelength bands is included in the captured images captured by the first imager 10 and the second imager 20. Therefore, the specificity of each pixel block 102 is maintained by the distribution pattern of the lights in the other wavelength bands, and the stereo correspondence point search can be accurately performed. Therefore, the distance to the surface of the object A1 can be accurately measured.

As shown in FIG. 8E, between the plurality of types of light regions (the dot lights DT1 to DT3), the maximum luminances are different from each other. Accordingly, these light regions (the dot lights DT1 to DT3) can be distinguished from each other according to the luminances, and the specificity of each pixel block 102 can be enhanced according to the distribution of these light regions (the dot lights DT1 to DT3). Therefore, the stereo correspondence point search can be accurately performed, and the distance to the surface of the object A1 can be accurately measured.

As shown in FIG. 2 and FIGS. 5A, 5B, the projector 30 includes the filter 35 in which a plurality of types of the filter regions 351 to 353 for respectively generating the plurality of types of light regions (the dot lights DT1 to DT3) are distributed in the same pattern as the pattern of the light regions (the dot lights DT1 to DT3). Accordingly, the pattern light 30*a* in which the plurality of types of light regions (the dot lights DT1 to DT3) are distributed in a desired pattern can be easily generated. Since variation (variation in luminance gradation) in diffraction efficiency due to a production error or an assembly error is not caused unlike a diffractive optical element, pattern light in which the plurality of types of light regions (the dot lights DT1 to DT3) are distributed in a desired pattern can be stably generated.

As shown in FIG. 2, the projector 30 includes: a plurality of the light sources 31 to 33 which emit lights in wavelength bands different from each other; and the optical system 34 which guides, to the filter 35, the lights emitted from the plurality of the light sources 31 to 33. Accordingly, lights for generating the plurality of types of light regions (the dot lights DT1 to DT3) can be easily applied to the filter 35.

As shown in FIGS. 8A, 8B, the plurality of the light sources 31 to 33 are provided so as to respectively correspond to the plurality of types of the filter regions 351 to 353, and each of the filter regions 351 to 353 selectively extracts light from a corresponding one of the light sources 31 to 33. Accordingly, the plurality of types of light regions (the dot lights DT1 to DT3) can be efficiently generated.

As shown in FIG. 8E, the maximum luminances based on the lights from the respective light sources 31 to 33 acquired based on a pixel signal from the second imager 20 are different from each other. Accordingly, the plurality of types of light regions (the dot lights DT1 to DT3) can be distinguished from each other according to the luminances, and the specificity of each pixel block 102 can be enhanced according to the distribution of these light regions (the dot lights DT1 to DT3). Therefore, the stereo correspondence point search can be accurately performed, and the distance to the surface of the object A1 can be accurately measured.

As shown in FIG. 11, the luminance adjuster 44 sets the light emission amounts (drive current values) of the plurality of the light sources 31 to 33 such that the maximum luminances based on the lights from the respective light sources 31 to 33 acquired based on a pixel signal from the second imager 20 are different from each other (S101, S107). Accordingly, even if the reflectance or the light absorption rate of the surface of the object A1 has wavelength dependency, the maximum luminances based on the lights from the respective light sources 31 to 33 can be made different from each other. Therefore, even if the reflectance or the light absorption rate of the surface of the object A1 has wavelength dependency, the plurality of types of light regions (the dot lights DT1 to DT3) can be distinguished from each other according to the luminances, and the specificity of each pixel block 102 can be enhanced according to the distribution of these light regions (the dot lights DT1 to DT3). Therefore, the stereo correspondence point search can be accurately performed, and the distance to the surface of the object A1 can be accurately measured.

In steps S101 and S107 in FIG. 11, the luminance adjuster 44 sets the light emission amounts (drive currents) of the plurality of the light sources 31 to 33 such that the maximum luminances based on the lights from the respective light sources 31 to 33 acquired based on a pixel signal from the second imager 20 are approximately evenly different in the order of the magnitude of luminance, as shown in FIG. 10E. Accordingly, the maximum luminances based on the lights from the respective light sources 31 to 33 can be made largely different from each other. Therefore, the plurality of types of light regions (the dot lights DT1 to DT3) can be clearly distinguished from each other according to the luminances, and the specificity of each pixel block 102 can be remarkably enhanced according to the distribution of these light regions (the dot lights DT1 to DT3). Therefore, the stereo correspondence point search can be more accurately performed, and the distance to the surface of the object A1 can be more accurately measured.

In the above embodiment, the light sources 31 to 33 are each a light-emitting diode. Accordingly, speckle noise can be inhibited from being superposed on the captured image (the first image 100, the second image 200) of the pattern light 30*a*. Therefore, the stereo correspondence point search can be accurately performed, and the distance to the surface of the object A1 can be accurately measured.

As shown in FIG. 7B, the pattern light 30*a* includes a lightless region (the lightless dot DT4). Accordingly, variation of the luminance gradation of the light regions (the dot lights DT1 to DT3, the lightless dot DT4) can be increased, and the specificity of each pixel block 102 according to the distribution of these light regions (the dot lights DT1 to DT3, the lightless dot DT4) can be further enhanced. In addition, overlapping of light regions (the dot lights DT1 to DT3) having frequency bands different from each other can be inhibited by the lightless region (the lightless dot DT4), and the luminance gradation based on these light regions (the dot lights DT1 to DT3) can be appropriately maintained. Therefore, the stereo correspondence point search can be more accurately performed, and the distance to the surface of the object A1 can be more accurately measured.

Modification 1

In the above embodiment, the three light sources 31 to 33 respectively corresponding to the dot lights DT1 to DT3 are provided in the projector 30. However, in Modification 1, only one light source is provided in the projector 30.

FIG. 12 is a diagram showing a configuration of the distance measuring device 1 according to Modification 1.

The projector 30 includes a light source 37, a collimator lens 38, the filter 35, and the projection lens 36. The light source 37 emits light in a wavelength band including selected wavelength bands of the plurality of types of the filter regions 351 to 353. The light source 37 is a white laser diode, for example. The collimator lens 38 collimates the light emitted from the light source 37. The collimator lens 38 forms an optical system that guides, to the filter 35, the light from the light source 37. The configurations of the filter 35 and the projection lens 36 are the same as those in the above embodiment. The configurations other than the projector 30 are the same as the configurations in FIG. 2.

Figure 13A:
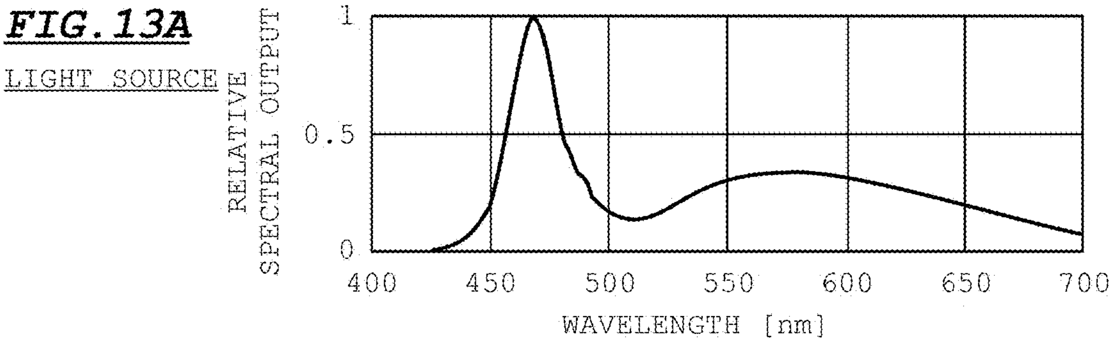
FIG. 13A to FIG. 13D are respectively graphs showing various types of spectral characteristics according to Modification 1.
Figure 13B:
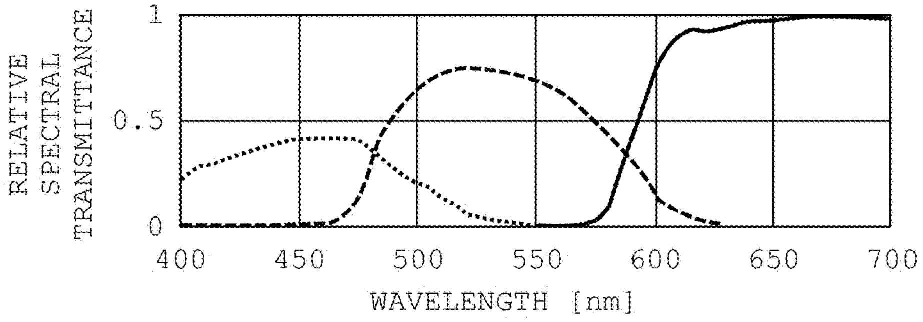
Figure 13C:
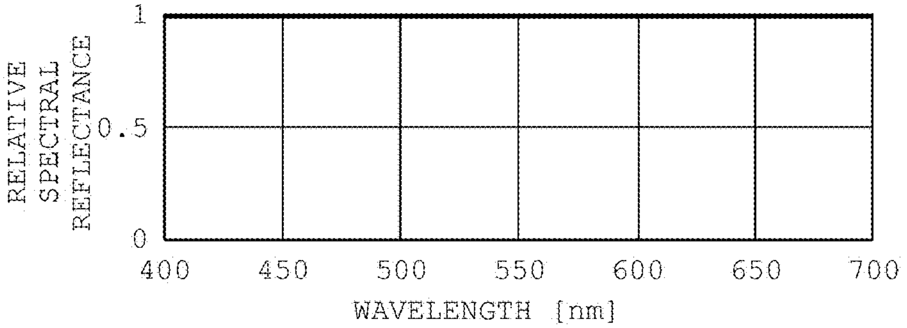
Figure 13D:
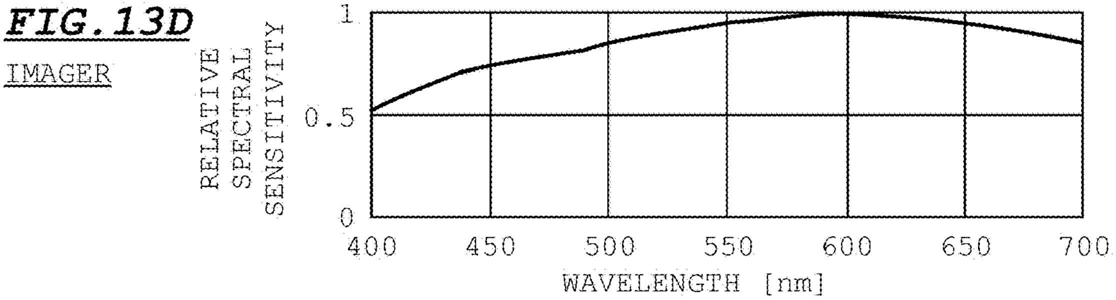
Figure 13E:
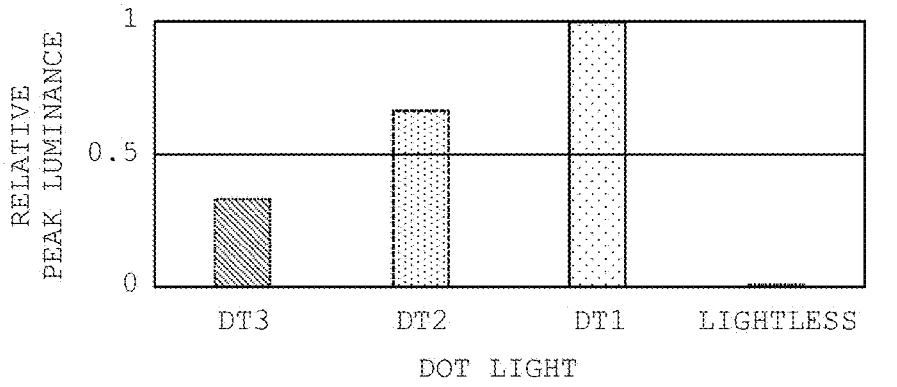
FIG. 13E is a graph showing the maximum luminance of each dot light according to Modification 1.

FIG. 13A is a graph showing a spectral output of the light source 37, and FIG. 13B is a graph showing spectral transmittances of the filter regions 351 to 353. FIGS. 13C to 13E are the same as FIGS. 8C to 8E.

When the light source 37 has the spectral output characteristic in FIG. 13A, and the filter regions 351 to 353 have spectral transmittance characteristics in FIG. 13B, if the spectral reflectance of the measurement surface (the surface of the object A1) and the spectral sensitivity of the first imager 10 and the second imager 20 respectively have the characteristics in FIGS. 13C, 13D, the maximum luminances of the dot lights DT1 to DT3 are approximately evenly different in the order of the magnitude of luminance as shown in FIG. 13E.

Therefore, according to the configuration of Modification 1, by merely causing the light source 37 to emit light, it is possible to make the maximum luminances of the dot lights DT1 to DT3 different from each other, and to make these maximum luminances approximately evenly different in the order of the magnitude of luminance. Therefore, similar to the above embodiment, the distance to the surface of the object A1 can be accurately measured. In addition, the number of components of the projector 30 can be reduced, and the configuration of the projector 30 can be simplified.

However, in the configuration of Modification 1, a light source is not provided for each of the dot lights DT1 to DT3.

Therefore, unlike the above embodiment, the light amounts of the dot lights DT1 to DT3 cannot be adjusted in accordance with the wavelength dependency of the reflectance of the surface of the object A1. Therefore, in order to more accurately perform the stereo correspondence point search when the reflectance of the surface of the object A1 has wavelength dependency, it is preferable that the light sources 31 to 33 are provided for the respective dot lights DT1 to DT3, as in the above embodiment.

In the configuration of Modification 1, the luminance adjuster 44 adjusts the light emission amount (drive current value) of the light source 37 such that: the maximum luminances based on the dot lights DT1 to DT3 are not saturated; and these maximum luminances appropriately fall within the range of gradation (e.g., 0 to 255) defining the luminance in the first imaging processor 41 and the second imaging processor 42. In this case, before the distance measurement, the luminance adjuster 44 causes the light source 37 to emit light at the initial value to acquire the second image 200, and acquires the maximum luminance from the second image 200. Then, when the maximum luminance is saturated or too low, the luminance adjuster 44 re-sets the drive current value of the light source 37, based on the relationship between the luminance and the drive current value, such that the maximum luminance becomes slightly smaller than the highest gradation. The maximum luminances of the dot lights DT1 to DT3 come to appropriately fall within the range of gradation (e.g., 0 to 255) defining the luminance.

Modification 2

In Modification 2, a light-shielding wall is formed at the boundary between filter regions adjacent to each other on the filter 35.

FIG. 14A is a diagram schematically showing a configuration of the filter 35 according to Modification 2. FIG. 14B is a diagram showing a partial region of FIG. 14A in an enlarged manner.

As shown in FIGS. 14A, 14B, in Modification 2, a light-shielding wall 355 is formed at the boundary between filter regions adjacent to each other on the filter 35. The height of the light-shielding wall 355 is the same as the thickness of the filter regions 351 to 354. The light-shielding wall 355 is formed in a matrix shape in advance on the above-described glass substrate forming the filter 35. One square of the matrix corresponds to one filter region. On the glass substrate on which the light-shielding wall 355 is formed in this manner, the filter regions 351 to 354 are formed through the above-described steps. Accordingly, the filter 35 having the configuration in FIGS. 14A, 14B is formed.

When the light-shielding wall 355 is formed in this manner, dot lights can be inhibited from overlapping each other due to seepage during transmission through the filter regions adjacent to each other. Thus, a good pattern light 30*a* in which the respective types of dot lights are clearly distinguished from each other can be generated. Accordingly, the stereo correspondence point search can be more accurately performed, and the distance to the surface of the object A1 can be more accurately measured.

Other Modifications

In the above Modification 1, a single light source 37 having a spectral output over the wavelength band of the spectral transmittances of the three filter regions 351 to 353 is provided in the projector 30. However, a light source having a spectral output over the wavelength band of the spectral transmittances of the two filter regions 352, 353 and a light source having a spectral output corresponding to the wavelength band of the spectral transmittance of the filter region 351 may be provided. Alternatively, a light source having a spectral output over the wavelength band of the spectral transmittances of the two filter regions 351, 352, and a light source having a spectral output corresponding to the wavelength band of the spectral transmittance of the filter region 353 may be provided.

In this case, an optical system in which lights from these two light sources are integrated to be guided to the filter 35 is provided in the projector 30. The light source having the spectral output over the wavelength bands of the two spectral transmittances may have such a spectral output characteristic that the maximum luminances based on the lights of these two wavelength bands are different from each other in the same manner as in FIG. 8E, and the output of the other one light source may be set such that the maximum luminance based on this light is different from the maximum luminances based on said two lights in the same manner as in FIG. 8E.

In the above embodiment, as shown in FIGS. 5A, 5B, four types of the filter regions 351 to 354 are provided at the filter 35. However, the types of filter regions provided at the filter 35 are not limited thereto. For example, two types of filter regions may be provided at the filter 35, or alternatively, five or more types of filter regions may be provided at the filter 35.

In this case, a plurality of light sources may be provided so as to be in one-to-one correspondence to the types of filter regions, or alternatively, a light source having spectral outputs corresponding to the spectral transmittances of a plurality of types of filter regions may be provided. That is, the number of light sources may be set to be smaller than the number of the types of filter regions, and dot lights in wavelength bands respectively different from each other may be generated from a plurality of types of filter regions, based on the light from a single light source. In this case as well, the spectral output of each light source and the spectral transmittance of each filter region may be set such that the maximum luminances of dot lights respectively generated through all types of filter regions are different from each other. More preferably, the spectral output of each light source and the spectral transmittance of each filter region may be set such that the maximum luminances of these dot lights are approximately evenly different in the order of the magnitude of luminance.

The spectral characteristics are not limited to those in FIGS. 8A to 8D, FIGS. 9A to 9D, FIGS. 10A to 10D, and FIGS. 13A to 13D. The spectral output of each light source and the spectral transmittance of each filter region can be changed as appropriate as long as the maximum luminances of dot lights generated through the filter regions are different from each other. In addition, the wavelength bands of each light source and each type of filter region are not limited to those shown in the above embodiment and modifications thereof.

The provision pattern of each type of filter region is not limited to the pattern shown in FIGS. 5A, 5B, and can be changed as appropriate. In this case as well, the provision pattern of the filter regions may be set such that the provision pattern of the respective types of dot lights in each pixel block is specific (random) at least in the search range R0.

In the above embodiment and modifications thereof, the filter 35 of a transmission type is shown as an example.

However, a filter of a reflection type may be used. In this case, for example, a reflection film is formed between the glass substrate forming the filter 35 and a material layer forming each filter region.

In the above embodiment and modifications thereof, a plurality of types of light regions having wavelength bands different from each other are the dot lights DT1 to DT3. However, these light regions need not necessarily be dots, and as long as the distribution pattern of the light regions has specificity (randomness) for each pixel block at least in the search range R0, the plurality of types of light regions may have a shape other than a dot.

In the above embodiment, in step S103 in FIG. 11, an image of the surface of the object A1 is captured by the second imager 20. However, in step S103 in FIG. 11, an image of the surface of the object A1 may be captured by the first imager 10, and the maximum luminance acquisition process in step S104 may be performed by using the first image 100 acquired by the first imager 10.

In the above embodiment and modifications thereof, two imagers, i.e., the first imager 10 and the second imager 20, are used, but three or more imagers may be used. In this case, these imagers are provided such that the fields of view overlap each other, and the pattern light 30*a* is projected onto the range where these fields of view overlap. The stereo correspondence point search are performed between imagers forming a set.

The use form of the distance measuring device 1 is not limited to the use form shown in FIG. 1 or a use form in which the distance measuring device 1 is installed at an end effector of a robot arm. The distance measuring device 1 may be used in another system in which a predetermined control is performed by using the distance to an object surface. In addition, the configuration of the distance measuring device 1 is not limited to the configuration shown in the above embodiment. For example, a photo sensor array in which a plurality of photo sensors are provided in a matrix shape may be used as the imaging elements 12, 22.

In addition to the above, various modifications can be made as appropriate to the embodiment of the present invention without departing from the scope of the technical idea defined by the claims.

What is claimed is:

1. A distance measuring device comprising:

a first imager and a second imager provided so as to be aligned such that fields of view thereof overlap each other;

a projector configured to project pattern light in which a plurality of types of light regions having wavelength bands different from each other are distributed in a predetermined pattern, onto a range where the fields of view overlap, wherein the projector comprises i) a filter including a plurality of types of filter regions for respectively generating the plurality of types of light regions and ii) a plurality of light sources, wherein the plurality of light sources are provided so as to respectively correspond to the plurality of types of filter regions, and wherein each of the filter regions selectively extracts light from a corresponding one of the light sources; and a measurer configured to measure a distance to an object surface onto which the pattern light is projected, by performing a stereo correspondence point searching process on images respectively acquired by the first imager and the second imager.

2. The distance measuring device according to claim 1, wherein between the plurality of types of light regions, maximum luminances are different from each other.

3. The distance measuring device according to claim 1, wherein the plurality of types of filter regions are distributed in a same pattern as the pattern of the light regions.

4. The distance measuring device according to claim 3, wherein the plurality of light sources is configured to emit lights in wavelength bands different from each other; and the projector comprises an optical system configured to guide, to the filter, the lights emitted from the plurality of light sources.

5. The distance measuring device according to claim 4, wherein each of the plurality of light sources is a light-emitting diode.

6. The distance measuring device according to claim 1, wherein maximum luminances based on the lights from the respective light sources acquired based on a pixel signal from the first imager or the second imager are different from each other.

7. The distance measuring device according to claim 1, comprising a luminance adjuster configured to respectively adjust light emission amounts of the plurality of light sources, wherein the luminance adjuster sets the light emission amounts of the plurality of light sources such that maximum luminances based on the lights from the respective light sources acquired based on a pixel signal from the first imager or the second imager are different from each other.

8. The distance measuring device according to claim 7, wherein the luminance adjuster sets the light emission amounts of the plurality of light sources such that the maximum luminances based on the lights from the respective light sources acquired based on the pixel signal from the first imager or the second imager are approximately evenly different in an order of magnitude of luminance.

9. The distance measuring device according to claim 1, wherein the pattern light includes a lightless region.

* * * * *